(12) United States Patent
Ushidate

(10) Patent No.: US 8,869,860 B2
(45) Date of Patent: Oct. 28, 2014

(54) FITTING DEVICE

(75) Inventor: Toshiyuki Ushidate, Habikino (JP)

(73) Assignee: Fuji Seal International, Inc., Osaka (JP)

( * ) Notice: Subject to any disclaimer, the term of this patent is extended or adjusted under 35 U.S.C. 154(b) by 276 days.

(21) Appl. No.: 13/634,108

(22) PCT Filed: Mar. 19, 2010

(86) PCT No.: PCT/JP2010/054863
§ 371 (c)(1),
(2), (4) Date: Sep. 11, 2012

(87) PCT Pub. No.: WO2011/114523
PCT Pub. Date: Sep. 22, 2011

(65) Prior Publication Data
US 2013/0000849 A1    Jan. 3, 2013

(51) Int. Cl.
B32B 38/00 (2006.01)
B32B 38/04 (2006.01)
B65C 3/06 (2006.01)
B65C 9/26 (2006.01)

(52) U.S. Cl.
CPC ............ B65C 3/065 (2013.01); B32B 38/04 (2013.01); B32B 38/00 (2013.01); B65C 9/26 (2013.01)
USPC ............ 156/521; 156/510; 156/516; 156/517

(58) Field of Classification Search
CPC .......... B65C 3/065; B65C 9/26; B32B 38/00; B32B 38/04
USPC .................................. 156/510, 516, 517, 521
See application file for complete search history.

(56) References Cited

U.S. PATENT DOCUMENTS

| 3,959,065 A * | 5/1976 | Ashcroft ................... 156/423 |
| 4,387,553 A * | 6/1983 | Strub et al. ................ 53/585 |
| 4,514,966 A * | 5/1985 | Konstantin ................. 53/585 |
| 2012/0011810 A1 | 1/2012 | Ushidate |

FOREIGN PATENT DOCUMENTS

| EP | 2 412 635 A1 | 2/2012 |
| JP | U-02-019708 | 2/1990 |
| JP | U-04-102202 | 9/1992 |
| JP | A-5-132036 | 5/1993 |

(Continued)

OTHER PUBLICATIONS

International Search Report issued in International Patent Application No. PCT/JP2010/054863 mailed Jun. 8, 2010.

(Continued)

*Primary Examiner* — Mark A Osele
*Assistant Examiner* — Christopher C Caillouet
(74) *Attorney, Agent, or Firm* — Oliff PLC

(57) ABSTRACT

A label fitting device provided with a plurality of mounting bases which move along a transport path while target bodies for fitting are respectively mounted on the bases; a fitting head which is provided directly above each mounting base and moves together with the mounting base; and a label supply mechanism provided directly above the transport path to supply labels. Each fitting head includes a take-up member which receives a label held by a label supply unit when the head passes a supply position, and an opener mechanism which receives the label from the take-up member, and thereafter opens the label and fits the label on the target body mounted on the mounting base.

6 Claims, 19 Drawing Sheets

(56) References Cited

FOREIGN PATENT DOCUMENTS

| JP | A-7-40938 | 2/1995 |
|---|---|---|
| JP | A-2003-212221 | 7/2003 |
| JP | B2-3620804 | 2/2005 |
| JP | 2005343479 * | 12/2005 |
| JP | A-2007-176527 | 7/2007 |
| JP | B2-4068359 | 3/2008 |
| WO | WO 2010/109535 A1 | 9/2010 |

OTHER PUBLICATIONS

Oct. 4, 2012 International Preliminary Report on Patentability issued in International Patent Application No. PCT/JP2010/054864; with English-language translation.

* cited by examiner

FITTING DEVICE

TECHNICAL FIELD

The present invention relates to a fitting device that opens a cylindrical label supplied in a folded sheet-like state and fits the label onto a columnar target body to which the label is to be fitted (which will be hereinafter referred to simply as a "target body").

BACKGROUND ART

Conventionally, fitting devices for fitting a cylindrical label made of a resin film onto a columnar target body such as plastic bottles have been known (refer to Patent Literatures 1 to 5 listed below, for example). These fitting devices are equipped with a take-up mechanism that receives a label which is folded into a sheet shape from a label supply device, and transfers the label to an opener mechanism.

The take-up mechanism in a conventional fitting device will be described with reference to FIGS. 17 and 18. FIG. 17 is a side view schematically illustrating a conventional fitting device which is disclosed in Patent Literature 1 and so on. Further, FIG. 18 is an image view illustrating how the label is transferred in a conventional fitting device seen from the above.

Many conventional label fitting devices include a mounting base 31 that rotationally moves about a first rotational shaft Oa and a fitting head 6, and a take-up unit 100 that rotationally moves about a second rotational shaft Ob that is different from the first rotational shaft Oa. A take-up member 102 provided on the take-up unit 100 has a substantially comb-teeth shape. Further, an opener member 92 provided on the fitting head 6 also has a substantially comb-teeth shape such that the comb-teeth of the opener member 92 can pass between the comb-teeth of the take-up member 102. As illustrated by solid lines in FIG. 18, the sheet-like label L is transferred when the opener member 92 rotationally moving about the first rotational shaft Oa and the take-up member 102 rotationally moving about the rotational shaft Ob come close to each other.

PRIOR ART DOCUMENT

Patent Literature

Patent Literature 1: JP 2007-176527 A
Patent Literature 2: JP 3620804 B
Patent Literature 3: JP 4068359 B
Patent Literature 4: JP 5-132036 A
Patent Literature 5: JP 2003-212221 A

SUMMARY OF THE INVENTION

Technical Problems

However, with such a rotational take-up unit 100, if the time for transferring the label L (the time at which the take-up member 102 and the opener member 92 come close to each other) does not match between the take-up member 102 and the opener member 92, the position of the label L in the width direction thereof with respect to the opener member 92 shifts, as illustrated by the chain double-dashed line in FIG. 18. Such a positional shift of the label L causes deficiencies in opening and fitting of the label L, which will be performed in the subsequent stages.

Further, Patent Literature 2 discloses a device that feeds an elongated tube between a pair of suction members (opener) by feed rollers provided above an opener and, when both sides of the tube are held by the pair of suction members, cuts the tube at a predetermined length to thereby form a label. With this structure, a positional shift of the label caused by a shift of the time for transferring the label L does not arise. However, the device described in Patent Literature 2 has a problem of poor working efficiency because a target body for fitting remains at a fixed position during the processing from the supply of the tube until the completion of fitting of the label.

It is therefore an advantage of the present invention to provide a fitting device that is capable of performing label fitting processing efficiency while preventing a positional shift of the label.

Solution to Problems

In accordance with an aspect of the invention, there is provided a label fitting device that opens a cylindrical label which is folded into a sheet shape and fits the label onto a columnar target body, the label fitting device including a plurality of mounting bases each moving along a predetermined transport path in a state in which the target body is placed thereon to thereby transport the target body; fitting heads respectively provided for the mounting bases on a one-to-one basis, each fitting head moving along the transport path in synchronization with the mounting bases and opening the label which is folded into a sheet shape and fitting the label onto the target body placed on the mounting base; and a label (supply) unit that cuts an elongated label base material sequentially to form the label and feeds the label base material and the label which is formed sequentially downward to transfer the label to the fitting head at a label supply position located immediately above the transport path, wherein each fitting head includes a take-up member that is provided immediately above the mounting base and that sucks the label held by the label supply unit when passing the label supply position and moves forward along the transport path with the movement of the fitting head to thereby separate the label from the label supply unit and receives the label; and an opener mechanism that is provided immediately above the mounting base and that moves upward to a position above the target body placed on the mounting base to receive the label from the take-up member and thereafter fits the label onto the target body placed on the mounting base.

The take-up member has a shape which is symmetrical with respect to a center in the width direction of the label base material or the label.

In accordance with a preferred aspect, the fitting device further includes a head holding member that is fixed to the take-up member and projects downward, wherein the take-up member, when the label is to be fitted onto the target body by the opener mechanism, moves downward such that the head holding member comes into contact with a head portion of the target body to press the target body to the mounting base.

In accordance with another preferred aspect, the opener mechanism includes a first suction member for holding one side of the label by suction, and the label is transferred from the take-up member to the opener mechanism by releasing suction of the label by the take-up member after the first suction member sucks the one side of the label which is held by the take-up member by suction. In this case, it is desirable that the opener mechanism further includes a second suction member that is provided opposing the first suction member with the label interposed therebetween and holds other side of the label by suction, and a drive mechanism that causes the first suction member and the second suction member to move close to each other and sandwich the label which is folded and thereafter causes the first suction member and the second suction member to move away from each other and open the label which is folded. In this case, it is desirable that, at the time of fitting the label, the first suction member and the second suction member, while holding the label by suction, move downward until the label reaches a predetermined fitting height.

Advantageous Effects of Invention

According to the present invention, as the label does not move in the lateral direction, a positional shift of the label in the width direction caused by a variation of the time for transferring the label can be prevented efficiently.

MODE FOR CARRYING OUT THE INVENTION

A label fitting system 1 according to an embodiment of the present invention will be described with reference to the drawings.

[Overall Configuration]

Figure 1:
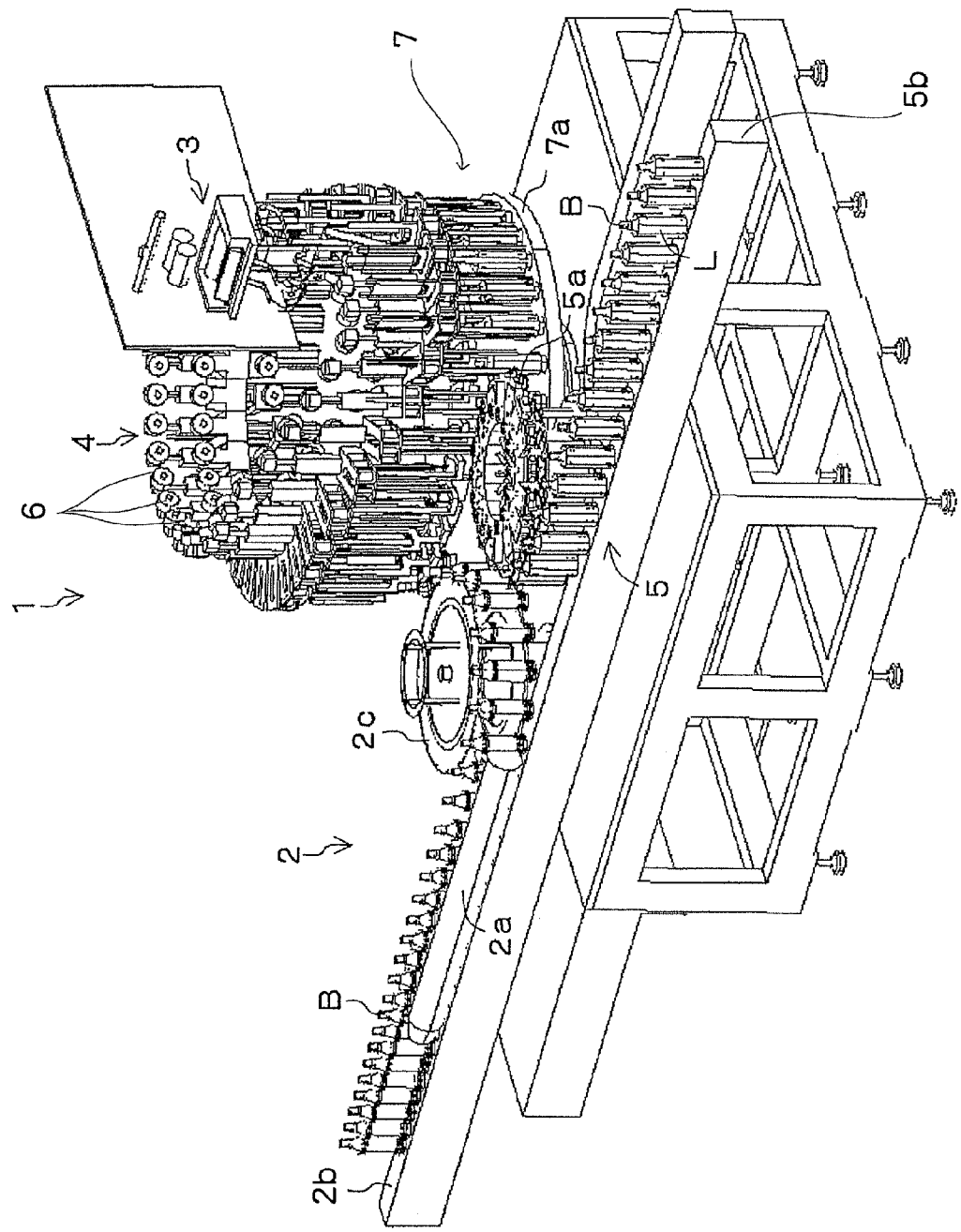
FIG. 1 Perspective view illustrating a label fitting system according to an embodiment of the present invention.
Figure 2:
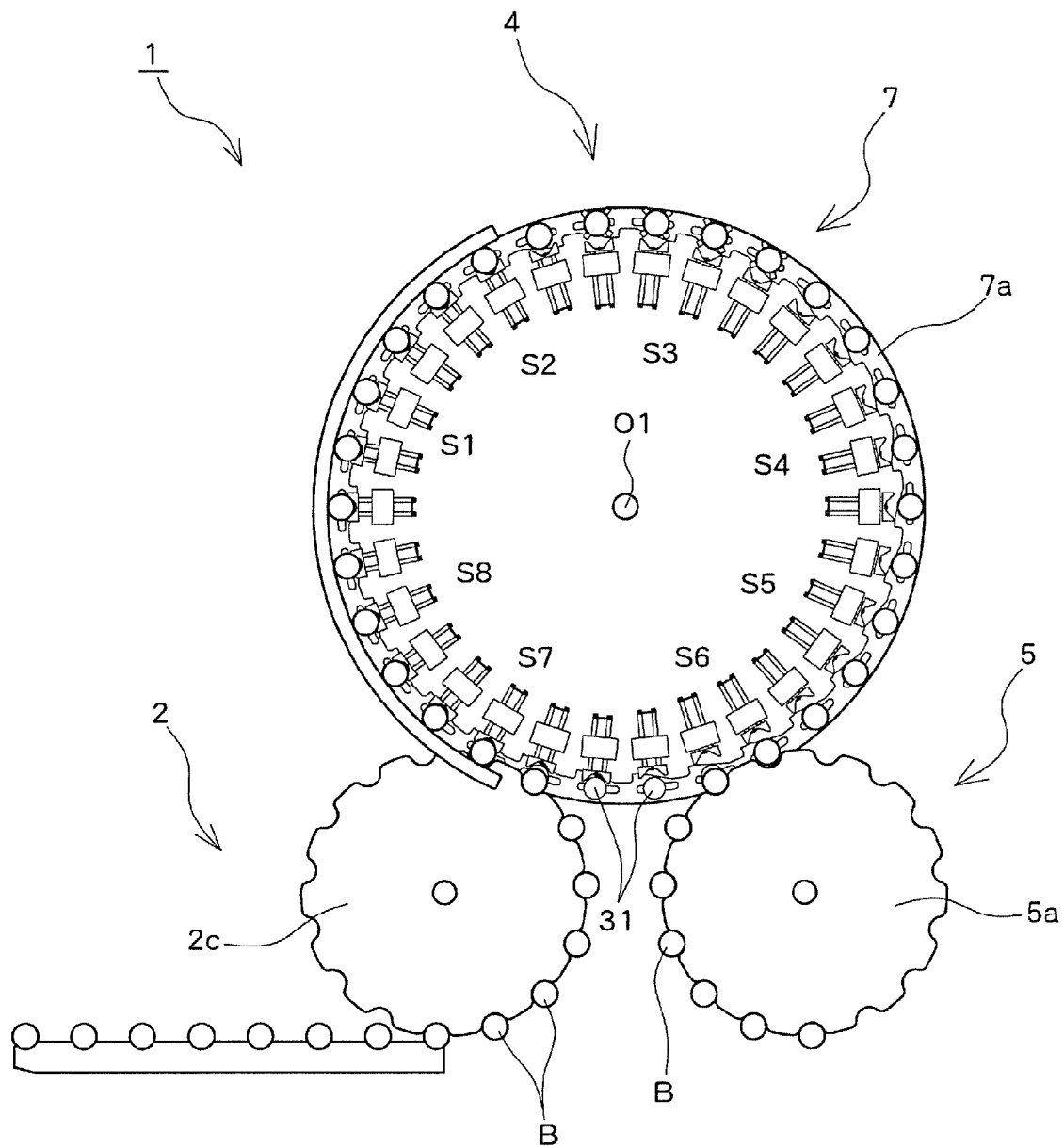
FIG. 2 Top view schematically illustrating the label fitting system.

First, an overall configuration of the label fitting system 1 will be schematically described. FIG. 1 is a perspective view of the label fitting system 1 and FIG. 2 is a schematic top view of the label fitting system 1. This label fitting system 1 is a system that fits a shrink label in a cylindrical shape which is formed of a heat-shrinkable film (hereinafter referred to as a "label") to a columnar target body B such as a plastic bottle. While the type of label that is used in the label fitting system 1 is not particularly restricted, the label fitting system 1 of the present embodiment has a configuration that is particularly preferable for handing a relatively thin (e.g. a thickness of 20 µm to 60 µm) label.

The label fitting system 1 is roughly divided into a target body supply device 2 for supplying a target body to which a label has not yet been fitted, a label fitting device 4 for fitting a label to the target body B which is supplied, and a target body discharge device 5 for transporting the target body B after the label has been fitted thereto to the outside of the system.

The target body supply device 2 includes a screw 2a, a belt conveyor 2b, a star wheel 2c, or the like, such that the target body supply device 2 can supply the target bodies B before the labels are fitted thereto to the label fitting device 4 at appropriate intervals. The target body discharge device 5 similarly includes a star wheel 5a, a conveyor 5b, or the like, for discharging the target bodies B after the labels are fitted thereto that are output from the label fitting device 4 to the outside of the system. Here, because the target body supply device 2 and the target body discharge device 5 can be configured by using known technology, the detailed description thereof will be omitted.

The label fitting device 4 is a device for fitting a label to the target body B which is supplied, and is roughly divided into a transport unit 7 for transporting the target bodies B, a fitting head 6 for fitting a label to the target bodies B, and a label supply unit 3 for supplying a label to the fitting head 6.

The transport unit 7 includes a turntable 7a that is rotatable about a rotational shaft O1, and a plurality of mounting bases 31 arranged in an annular shape on the turntable 7a. With the rotation of the turntable 7a in a state in which the target body B is placed on each mounting base 31, the target bodies B are transported from a target body supply position S7 to a target body discharge position S6.

The fitting head 6 is a unit that fits the label to the target body B during this transporting process. Each fitting head 6 corresponds to a single mounting base 31, so that the fitting heads 6 move along an annular transport path in synchronization with the mounting bases 31. This fitting head 6 is roughly divided into a take-up mechanism 40 for receiving a label from the label supply unit 3 and an opener mechanism 50 for opening the label that is received and fitting the label onto the target body B. The take-up mechanism 40, when the fitting head 6 passes the label supply position S1, receives the label folded into a sheet shape from the label supply unit 3. The opener mechanism 50 receives the sheet-shape label from this take-up mechanism 40 and opens the label. Thereafter, the opener mechanism 50 fits the label thus opened to the target body B at the label fitting position S3.

The label supply unit 3 is a unit that supplies a label folded into a sheet shape to the fitting head 6, and is disposed above the fitting head 6 at the label supply position S1. The label supply unit 3 cuts a label base material folded into a sheet shape at a predetermined pitch to form the label, and further feeds the label downward and supplies it to the fitting head 6. As described above, the fitting head 6 receives the label folded into a sheet shape and fits the label to the target body B. The target body B to which the label has been fitted is discharged to the target body discharge device 5 at the target body discharge position S6.

The schematic structure of the label fitting system 1 is as described above. In this label fitting system 1, each section of the label fitting device 4 will be described in detail below.

[Label Supply Unit]

Figure 4:
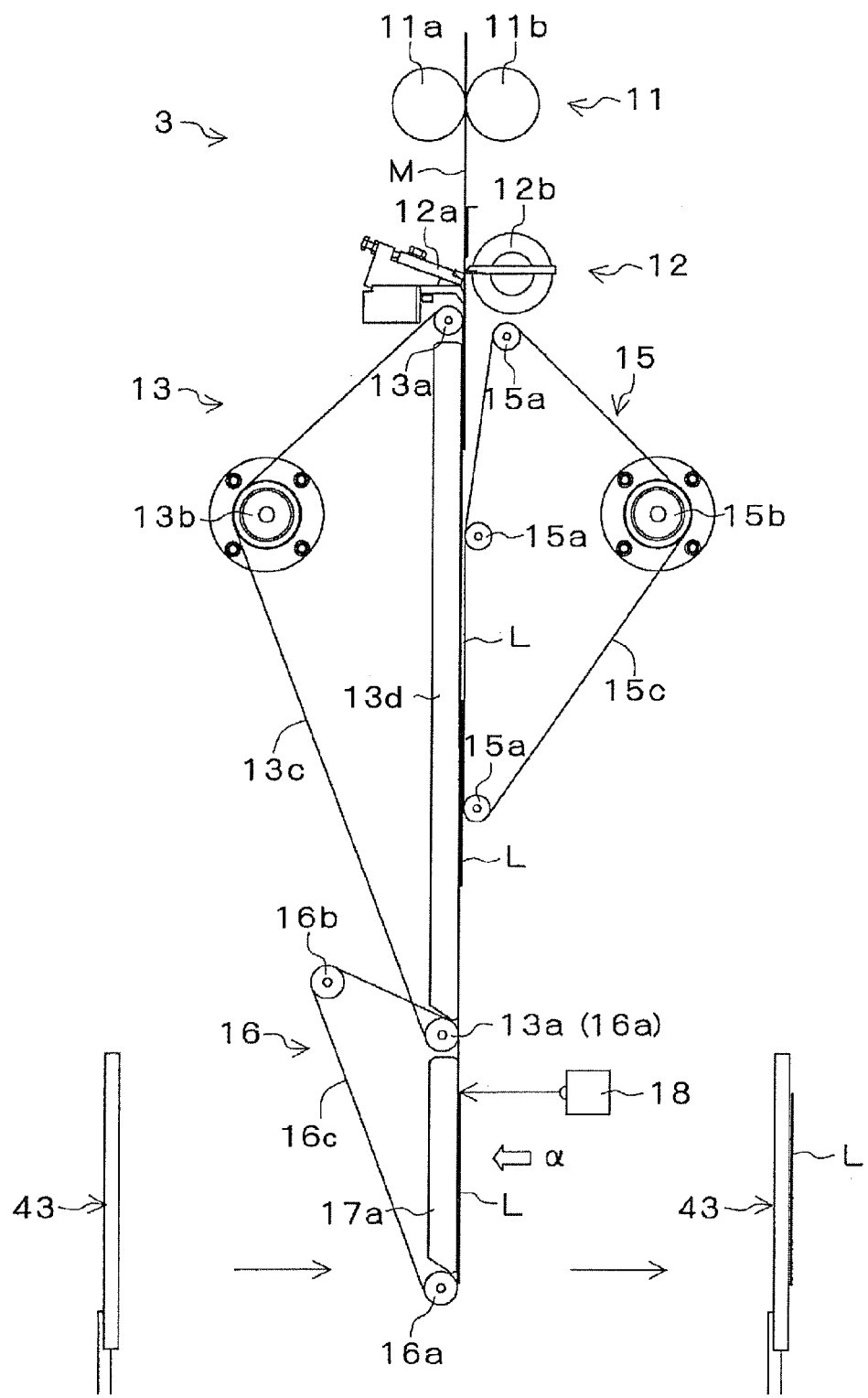
FIG. 4 Side view of a label supply unit.
Figure 5:
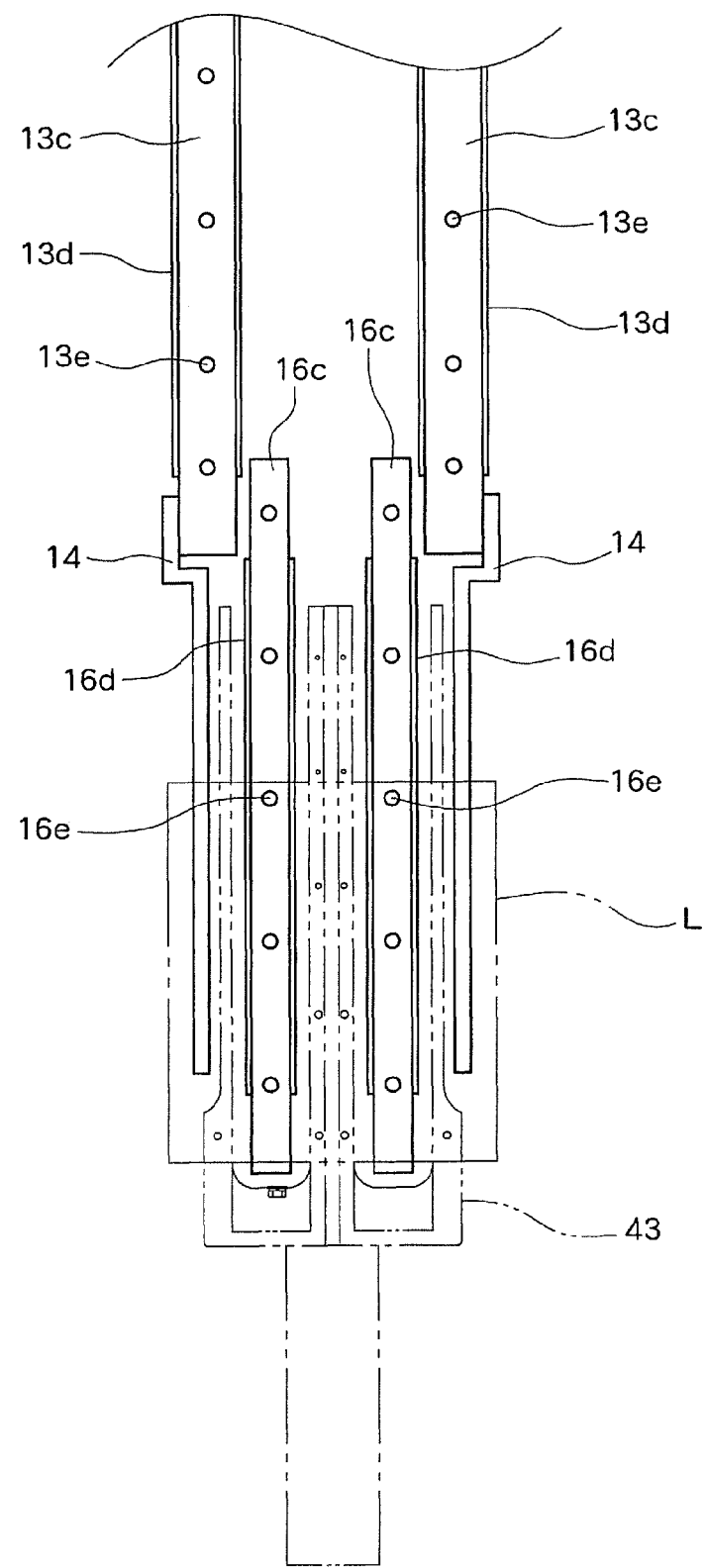
FIG. 5 Front view of a label supply unit.

First, the label supply unit 3 will be described in detail. FIGS. 4 and 5 are a side view and a front view of the label supply unit 3, respectively. As described above, the label supply unit 3 is a unit that is fixed above the fitting head 6 at the label supply position S1 and supplies a sheet-shape label L to the fitting head 6 passing below.

The level supply unit 3 includes a base material feed roller pair 11, a cutting device 12, an upper side feed mechanism 13, a lower side feed mechanism 16, a label detection sensor 18, a guide member 14, and so on. The base material feed roller pair 11 is a roller pair for feeding a label base material M supplied from the upstream side sequentially downward, and is composed of a drive roller 11a and a slave roller 11b which is disposed opposite the drive roller 11a. Here, the label base material M refers to a member obtained by forming an elongated heat-shrinkable film into a tubular shape and thereafter folding the film into a sheet shape. The label base material M is cut at each predetermined pitch to thereby form the label L.

The cutting device 12 is provided below the base member feed roller pair 11. The cutting device 12 cuts the label base material M which is fed, at each predetermined pitch to thereby form a label, and includes a rotary blade 12b and a fixed blade 12a.

The sheet-shape label L which is formed by cutting with the cutting device 12 is fed further downward by the upper side feed mechanism 13. The upper side feed mechanism 13 is a mechanism that feeds the sheet-shape label L while holding the label L by suction. The upper side feed mechanism 13 includes two upper side feed belts 13c disposed at an interval in the width direction of the label, and these two upper side feed belts 13c are used to hold both ends of the label L in the width direction by suction. A plurality of suction holes 13e are formed on the surface of the upper feed belt 13c at fixed intervals for holding the label by suction, and a suction device 13d for enabling such suction holding is disposed on the back side of the upper feed belt 13c. Each upper side feed belt 13c is provided to travel over a drive pulley 13b and a guide pulley 13a and is configured to move in a circulatory fashion with the rotation of the drive pulley 13b. With such a circulation movement of the upper side feed belts 13c, the label L held by the upper side feed belts 13c by suction is fed downward. Further, an auxiliary belt 15 is also provided opposite the upper side feed belt 13c. The auxiliary belt 15c presses the surface of the label L which is held on the upper side feed belt 13c to thereby prevent dropping of the label L.

The lower side feed mechanism 16 is a mechanism that receives the label L fed to the lower end of the upper side feed mechanism 13 and transfers the label L to a take-up member 43 of a take-up mechanism of the fitting head 6. The lower side feed mechanism 16 has substantially the same configuration as that of the upper side feed mechanism 13, and includes two lower side feed belts 16c, a suction device 16d, a guide roller 16a, a drive roller 16b, and so on. The lower side feed mechanism 16, however, does not include the auxiliary belt 15c that presses the surface of the label L, contrary to the upper side feed mechanism 13. Further, the two lower side feed belts 16c are disposed between the two upper side feed belts 13c, and the distance between the two lower side feed belts 16c is smaller than the distance between the two upper side feed belts 13c.

A pair of guide members 14 are provided on the right and left sides of the pair of lower side feed belts 16c. The guide members 14 guide the take-up member 43 to a predetermined path, and also exert an effect of preventing bending of the label L at the end portion in the width direction.

The label detection sensor 18 detects whether or not the label L fed to the lower side feed mechanism 16 has reached a predetermined stop position (height). If the label detection sensor 18 detects the label L reaching the predetermined stop position, a control unit, which is not illustrated, instructs the lower side feed mechanism 16 to temporarily stop feeding of the label L. At this time, the control unit also performs synchronization control such that the fitting head 6 which is to receive the label L next passes the label supply position S1 (i.e. the position immediately below the label supply unit 3). Then, as illustrated in FIG. 5, when the take-up member 43 having a substantially fork shape, that is provided in the take-up mechanism, passes between the lower side feed belts 16c, the sheet-shape label L held on the lower side feed belts 16c is transferred to the take-up member 43.

[Transport Unit]

Figure 3:
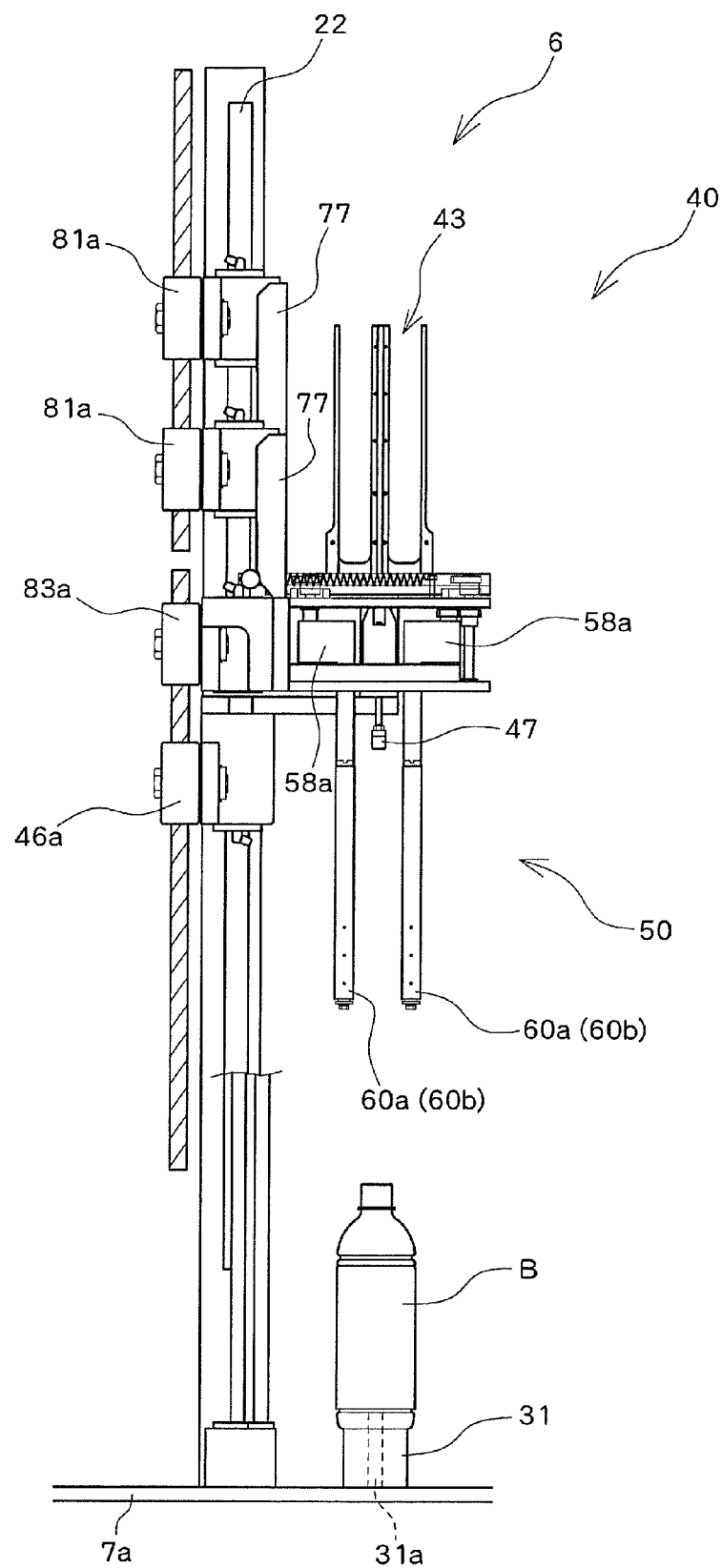
FIG. 3 Front view illustrating a mounting base and a fitting head.

Next, the transport unit 7 will be described in detail with reference to FIGS. 2 and 3. As described above, the transport unit 7 is a unit that transports the target body B that is supplied at the target body supply position S7 to the target body discharge position SE, and includes a turntable 7a and a plurality of mounting bases 31. The turntable 7a moves rotationally about a rotational shaft O1, and driving thereof is controlled by the control unit. A plurality of mounting bases 31 are evenly arranged in an annular shape about the rotational shaft O1 near the circumferential edge of the turntable 7a. The target body B is placed on each mounting base 31. Each mounting base 31 with the target body B placed thereon moves along a predetermined annular transport path with the rotation of the turntable 7a, thereby transporting the target body B.

A suction port 31a is provided in substantially the center of each mounting base 31 for holding the bottom portion of the target body B by suction. This suction port 31a is coupled to a suction pump which is not illustrated. By allowing the target body B to be sucked via this suction port 31a, dropping of the target body B from the mounting base 31, misalignment of the target body B on the mounting base 31, and so on can be prevented. As will be described in detail below, according to the present embodiment, a first suction rod 60a and a second suction rod 60b (which will be hereinafter collectively referred to as a "suction rod 60" when they need not be particularly discriminated from each other) provided in the opener mechanism 50 are moved downward to the vicinity of the bottom of the target body B. In order to prevent the suction rods 60 from interfering with the mounting base 31 at this time, the mounting base 31 is configured to have a diameter which is substantially the same as or slightly smaller than that of the target body B.

[Take-Up Mechanism of Fitting Head]

The fitting head 6 will be described in detail. As described above, the fitting head 6 is a unit that is provided for each mounting base 31 based on one-to-one correspondence, and moves along the annular transport path with the mounting base 31. The fitting head 6 includes the opener mechanism 50 and the take-up mechanism 40. First, the take-up mechanism 40 will be described with reference to FIG. 6.

Figure 6:
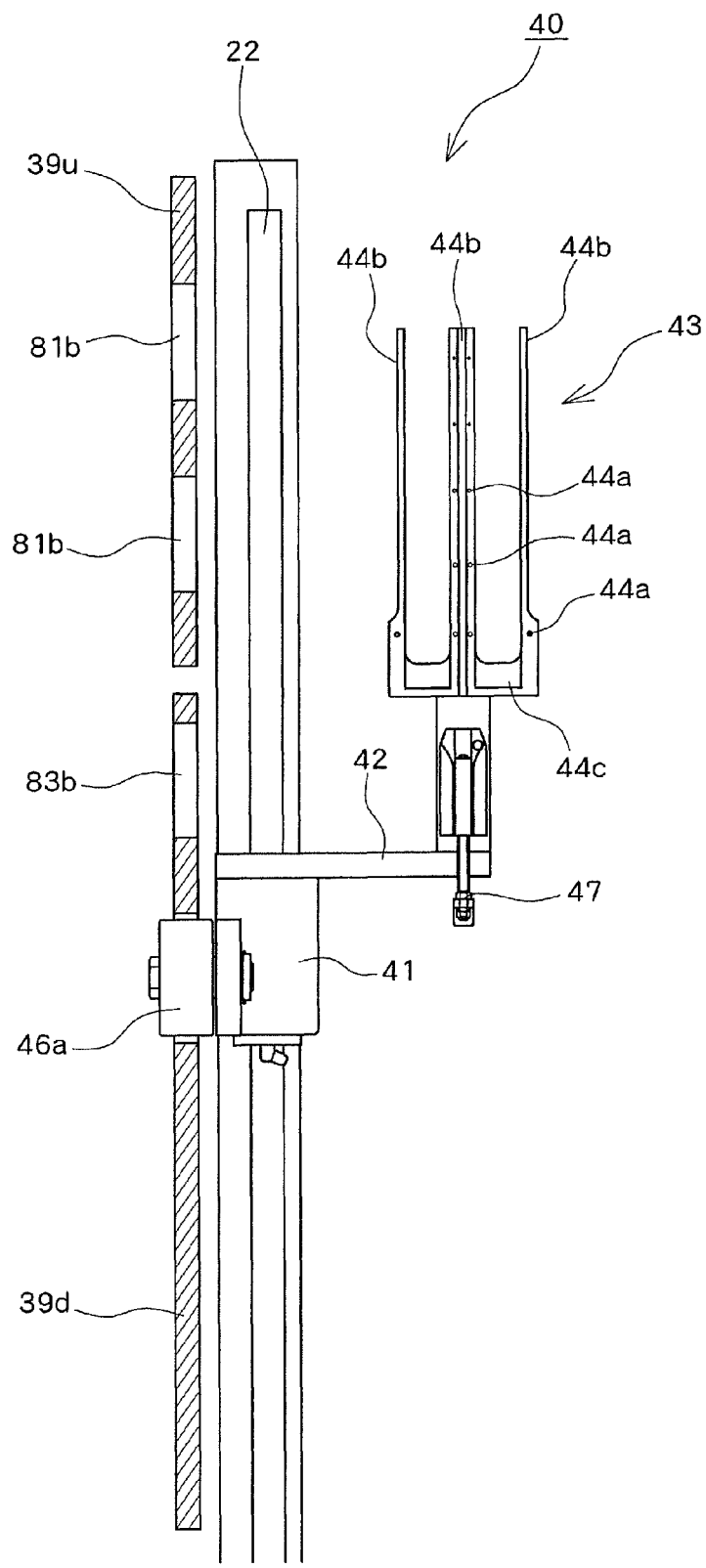
FIG. 6 View illustrating only portions of the fitting head associated with a take-up mechanism.

FIG. 6 is a view illustrating only portions of the fitting head 6 relevant to the take-up mechanism 40. The take-up mechanism 40 includes the take-up member 43, a take-up elevator mechanism for moving the take-up member 43 upward and downward, a head holding member 47, and so on.

The take-up elevator mechanism includes a cam slot 46b (see FIG. 7) formed in a lower side cam columnar member 39d, a cam block 46a fitted in the cam slot 46b, a linear guide 22 for guiding the upward and downward movement and a base plate 41, a coupling member 42 for coupling the base plate 41 and the take-up member 43, and so on. The lower side cam columnar member 39d is a substantially columnar member provided concentrically with the rotational shaft O1 of the turntable 7a, and includes the cam slot 46b that defines the upward and downward movement of the take-up member 43 formed on the surface thereof. The cam block 46a is a block member fitted into the cam slot 46b, and moves upward and downward along the cam slot 46b with the movement of the fitting head 6 (or the take-up mechanism 40, by extension) along the annular transport path. This upward and downward movement of the cam block 46a is transmitted to the take-up member 43 via the base plate 41 and the coupling member 42. Here, the base plate 41 is guided by the linear guide 22 disposed in the vertical direction so as to allow smooth upward and downward movement.

The take-up member 43 is a member that receives a label L folded into a sheet shape from the label supply unit 3. The take-up member 43 has a substantially fork shape including three suction sections 44b having suction holes 44a formed on the surface thereof and a coupling section 44c for coupling base ends of these suction sections. The take-up member 43 has a hollow interior and is coupled to a suction pump which is not illustrated. The take-up member 43 is configured to allow suction holding of the sheet-shape label L on the surface thereof in accordance with driving of the suction pump. Here, the take-up member 43 may be configured such that the suction holes used for suction of the label are changed in accordance with the height (the length in the vertical direction) of the label L which is to be actually held by suction.

The three suction sections 44b are arranged spaced apart in the width direction of the label. The spacing of these three suction sections 44b is determined such that the three suction sections 44b can pass through the spaces between the two lower side feed belts 16c provided in the label supply unit 3. Specifically, as illustrated in FIG. 5, the take-up member 43 is configured such that these suction sections 44b are located on both sides of and between the two lower side feed belts 16c when the take-up member 43 passes the label supply position S1. Further, when passing both sides of and between the lower side feed belts 16c, the take-up member 43 pushes out the label L, which has been suction held by the lower side feed belts 16c, in the direction away from the lower side feed belts 16c while holding one side of the label L by suction. With this pushing operation, the sheet-shape label L is transferred from the lower side feed belt 16c to the take-up member 43.

Further, the sheet-shape label L that is suction held by the take-up member 43 is then transferred to the opener mechanism 50. Such transfer of the label L to the opener mechanism 50 is performed as illustrated in FIG. 16. Specifically, after suction holding one side the sheet-shape label L by the two first suction rods 60a that have been moved upward to substantially the same height as that of the take-up member 43, the suction holding of the label L by the take-up member 43 is released, and the take-up member 43 is moved upward to a height where the take-up member 43 does not interfere with the first suction rods 60a.

As is clear from the above description, according to the present embodiment, the label L is not moved in the width direction thereof at the time of transfer of the label L. Accordingly, a positional shift of the label L in the width direction or the like can be prevented, contrary to the conventional art.

Figure 17:
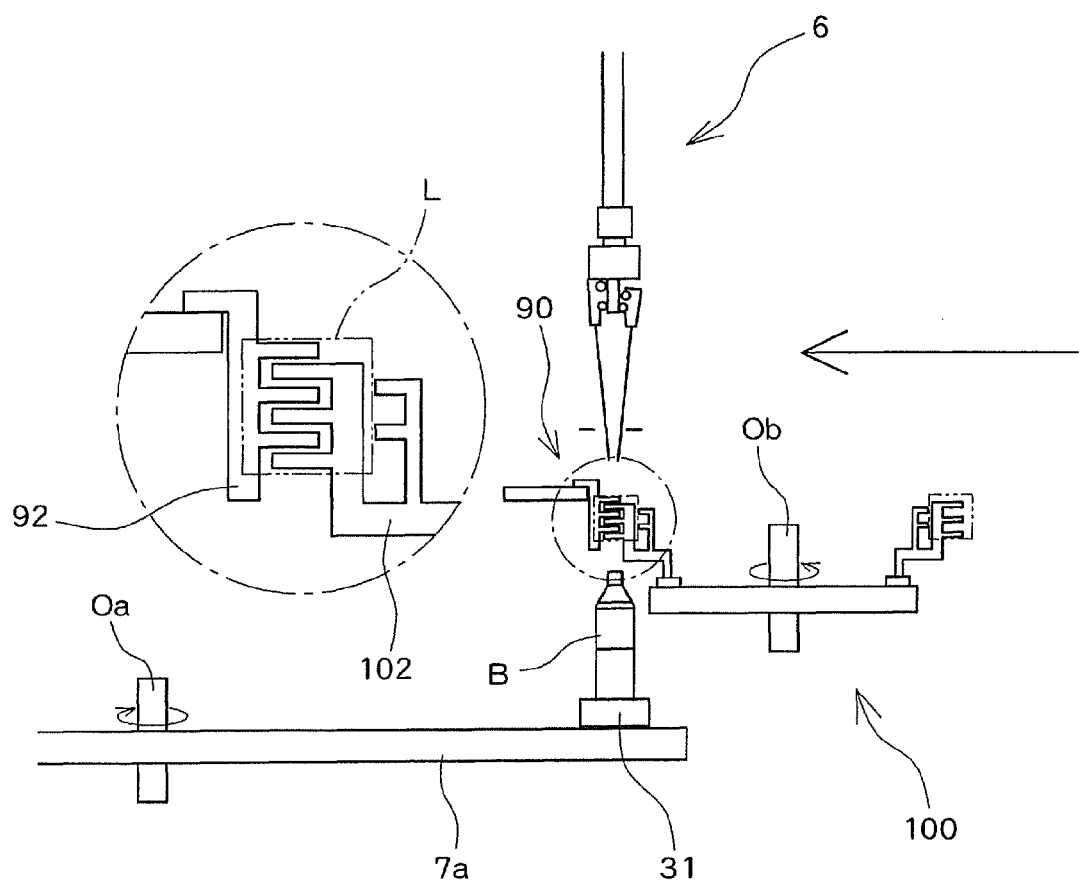
FIG. 17 Side view schematically illustrating a conventional fitting device.
Figure 18:
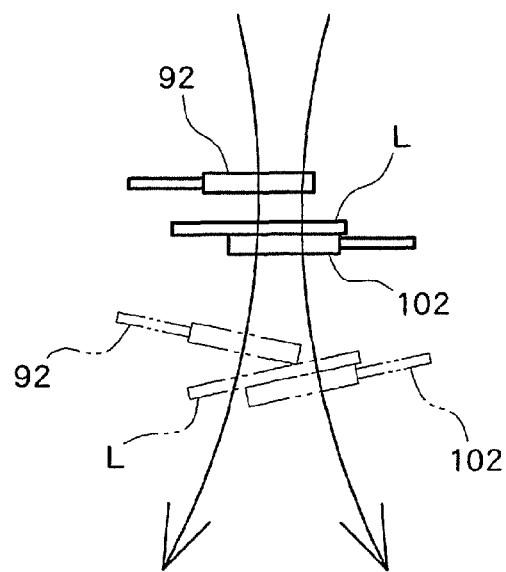
FIG. 18 View illustrating how the label is transferred in the conventional fitting device.

The above advantage of the present embodiment will be described in detail in comparison with conventional technology. FIG. 17 is a front view schematically illustrating a conventional label fitting device 4 and FIG. 18 is an image view illustrating how the label is transferred in the conventional label fitting device. As illustrated in FIG. 17, many conventional label fitting devices include a mounting base 31 that rotationally moves about a first rotational shaft Oa and a fitting head 6, and a take-up unit 100 that rotationally moves about a second rotational shaft Ob that is different from the first rotational shaft Oa. A take-up member 102 provided on the take-up unit 100 has a substantially comb-teeth shape. Further, an opener member 92 provided on the fitting head 6 also has a substantially comb-teeth shape such that the comb-teeth of the opener member 92 can pass between the comb-teeth of the take-up member 102. As illustrated by solid lines in FIG. 18, the sheet-like label L is transferred when the opener member 92 rotationally moving about the first rotational shaft Oa and the take-up member 102 rotationally moving about the rotational shaft Ob come close to each other.

However, with such a rotational take-up unit 100, if the time for transferring the label L (the time at which the take-up member 102 and the opener member 92 come close to each other) does not match between the take-up member 102 and the opener member 92, the position of the label L in the width direction thereof with respect to the opener member 92 shifts, as illustrated by the chain double-dashed line in FIG. 18. Such a positional shift of the label L causes deficiency in opening and fitting of the label L, which will be performed in the subsequent stages.

According to the present embodiment, on the other hand, the take-up mechanism 40 is incorporated in the fitting head 6 to thereby enable transfer of the label without moving the label in the width direction. Consequently, even if the time for transferring the label from the label supply unit 3 to the take-up mechanism 40 and the time for transferring the label from the take-up mechanism 40 to the opener mechanism 50 shift slightly from each other, a positional shift of the label in the width direction is unlikely to occur, and it is possible to transfer the label L to the opener mechanism 50 at an optimal position on all occasions.

Further, with the conventional rotational take-up unit 100, due to the structural restrictions thereof, there was no choice but to form the opener member 92 and the take-up member 102 in a substantially comb-teeth shape in which the teeth protrude in the horizontal direction, i.e. in an asymmetrical shape. In this case, the force for holding the label L was also asymmetrical, making it difficult to hold the label L in a stable manner. As a result, there were cases in which a part of the label L was folded. On the other hand, as the take-up member 43 according to the present embodiment has a symmetrical shape in which the three suction sections 44*b* are arranged in the width direction of the label, it is possible to hold the label L evenly. As a result, folding of the label L or the like can be efficiently prevented.

Referring back to FIG. 6, the take-up mechanism 40 according to the present embodiment will be described in detail. The take-up mechanism 40 further includes the head holding member 47. The head holding member 47 is a rod shape member fixed to the lower portion in the center of the take-up member 43. This head holding member 47 is a member that comes in contact with the head portion of the target body B to press the target body B against the mounting base 31 at the time of label fitting.

Figure 15C:
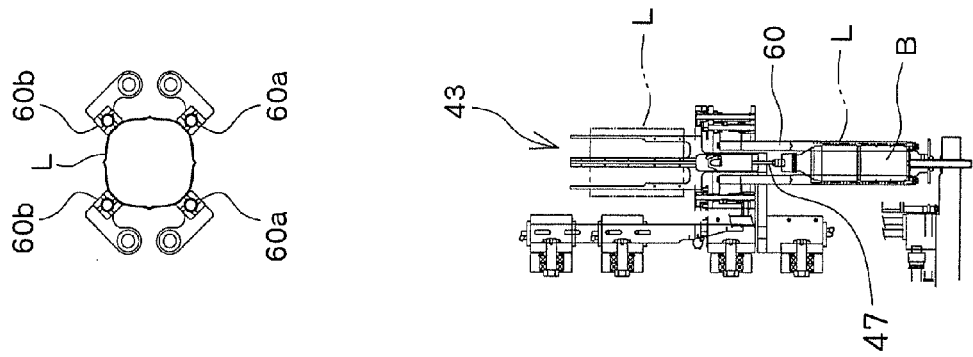
FIG. 15c View illustrating the state of the fitting head at position S3.

More specifically, as illustrated in the right end portion of FIG. 15, according to the present embodiment, when the suction rods 60 provided in the opener mechanism 50 move down to the vicinity of the target body B for label fitting, the take-up member 43 also moves down. This downward movement of the take-up member 43 causes the head holding member 47 to also move down. Then, finally, the head holding member 47 comes in contact with the head portion of the target body B placed on the mounting base 31 to press the target body B onto the mounting base 31. With this pressing operation, dropping or misalignment of the target body B can be efficiently prevented.

Specifically, as described above, each target body B is placed on the mounting base 31 and the suction port 31*a* for holding the bottom portion of the target body B by suction is provided in the mounting base 31. If the bottom portion of the target body B is flat, the target body B is held by such a suction port 31*a* in a stable state. However, if the bottom portion of the target body B is not flat, it is difficult to hold the target body B in a stable state with only the suction port 31*a*.

As another method for holding the non-flat target body B in a stable manner, it can be considered, for example, to form the mounting base 31 having an upper surface with a diameter that is larger than that of the target body B, and further form a recess portion on the upper surface into which the bottom portion of the target body B is fitted. Further, another method in which a support member that supports the barrel potion of the target body B placed on the mounting base 31*a* is provided may be considered. However, as will be described in detail below, in the present embodiment, as a thin label is handled, it is necessary to move the suction rods provided in the opener mechanism 50 down below the lower end of the target body B. In this case, if the mounting base 31 has a large diameter or the support member for supporting the barrel portion of the target body B is provided, the mounting body 31 interferes with the suction rods 60. Accordingly, in the present embodiment in which it is necessary to move the suction rods 60 down below the lower end of the target body B, it is not possible to provide such a recess portion or a support member. In order to address this problem, in the present embodiment, the head holding member 47 is provided in the take-up member 43, thereby holding the head portion of the target body B with this head holding member 47. As a result, it is possible to efficiently prevent the misalignment or the like of the target body B while preventing interference between the suction rods 60 and other members.

Here, as described above, the head holding member 47 is fixed to the take-up member 43 and moves downward with the downward movement of the take-up member 43. This downward operation of the take-up member 43 is essential for transferring the label L to the opener mechanism 50. In other words, according to the present embodiment, the operation which is essential for the label transfer is utilized to realize holding of the target body B by means of the head holding member 47, without adding any special operations for holding the target body B. Consequently, the driving control can be simplified. Here, while the length of the head holding member 47 may be fixed, it may be changed as appropriate in accordance with the height of the target body B. As a method of changing, the head holding member 47 may be configured such that it is slidable in the upward and downward direction, or the head holding member 47 may be selectively changed.

[Opener Mechanism of Fitting Head]

Figure 7:
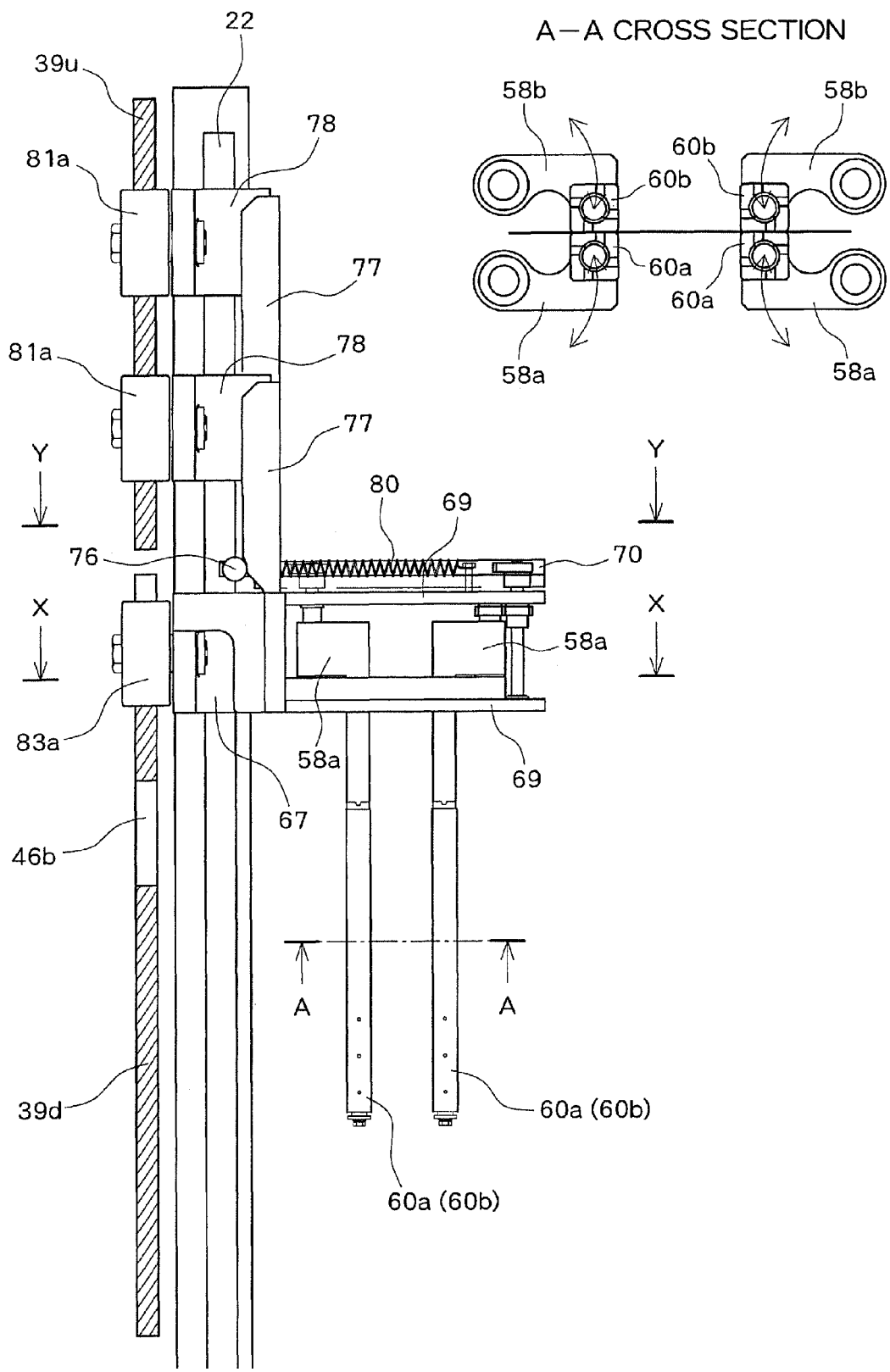
FIG. 7 View illustrating only portions of the fitting head associated with an opener mechanism.

Next, the opener mechanism 50 will be described in detail. First, referring to FIG. 7, the whole structure of the opener mechanism 50 will be schematically described. FIG. 7 is a view in which only portions of the fitting head 6 related to the opener mechanism 50 are extracted. As described above, the opener mechanism 50 is a mechanism that opens or expands the label L folded into a sheet shape and then fits the label L on the target body B. The opener mechanism 50 includes two pairs of (i.e. four) suction rods 60, a rod driving mechanism that moves the opposing suction rods 60 toward or away from each other, and a rod elevator mechanism that moves the suction rods 60 upward and downward.

The two pairs of (i.e. four) suction rods 60 are roughly divided into two first suction rods 60*a* that hold one side of the label L by suction, and two second suction rods 60*b* that hold the other side of the label L by suction. The two first suction rods 60*a* are arranged in the width direction of the label L with an interval therebetween. Further, the two second suction rods 60*b* are arranged in the width direction of the label L with an interval therebetween at locations opposite to the first suction rods 60*a*. Each suction rod 60 is rotatable about a predetermined rotation center and is configured to move close to or away from the opposing suction rod 60 with the rotation thereof.

When opening or expanding the label L folded into a sheet shape, after holding both sides of the label L in a sheet shape by suction by the first suction rods 60*a* and the second suction rods 60*b*, the first suction rod 60*a* and the second suction rod 60*b* that are opposed to each other are moved away from each other. With this movement of the first suction rod 60*a* and the second suction rod 60*b*, the label L which is folded into a sheet shape is opened into a cylindrical shape. Then, when fitting the label onto the target body B, the four suction rods 60 are moved downward to the vicinity of the bottom of the target body B with the label L being opened into a cylindrical shape. Further, when receiving the label L from the take-up mechanism 40, one side of the label L which is held by the take-up member 43 by suction is held, by suction, by the first suction rods 60*a*.

These four suction rods 60 are moved upward or downward by the rod elevator mechanism in accordance with the situation of fitting processing (more accurately, the target position the fitting head 6 which rotationally moves will reach). The rod elevator mechanism includes a cam slot 83*b* (see FIG. 6) formed in the lower side cam columnar member 39*d*, a cam block 83*a* fitted into the cam slot 83*b*, a linear guide 22 for guiding the upward and downward movement of the cam block 83*a* and a base plate 67, and so on, as will be described in detail below.

Further, the suction rods that are opposed to each other are moved toward or away from each other by the rod driving mechanism in accordance with the situation of the fitting processing (more accurately, the target position the fitting head 6 which rotationally moves will reach). The rod driving mechanism is composed of support arms 58*a* and 58*b* that rotatably support each suction rod 60, a cam slot 81*b* (see FIG. 6) formed in the upper side cam columnar 39*u*, a cam block 81*a* fitted in the cam slot 81*b*, transmission members that convert the upward and downward movement of the cam block 81*a* into a rotation movement and transmit the rotation movement to the support arms 58*a* and 58*b*, and so on. Here, the upper side cam columnar member 39*u* is shared by a plurality of fitting heads 6. By moving the upper side cam columnar member 39*u* relatively with respect to the lower side cam columnar member 39*d*, the states of the suction rods 60 that are close to each other or away from each other can be changed collectively by the plurality of fitting heads 6, as will be described in detail below.

The schematic overall structure of the opener mechanism 50 is as described above. Each section of the opener mechanism 50 will be described in detail below.

Figure 8:
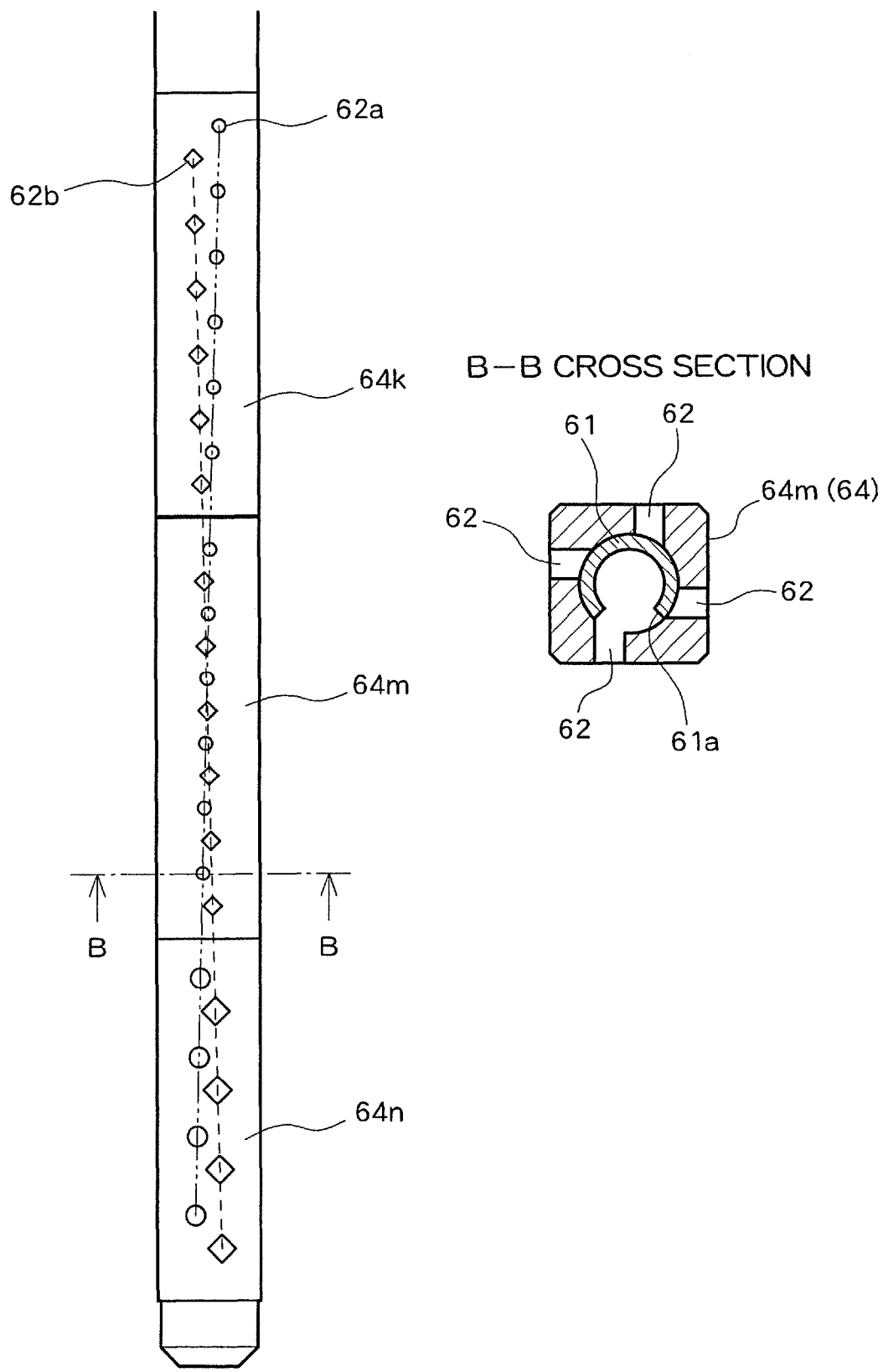
FIG. 8 Front view and cross sectional view of a suction rod.

First, the suction rods will be described with reference to FIGS. 7 and 8. FIG. 8 includes a front view and a cross sectional view of the suction rod. In FIG. 8, circles represent an example arrangement of the suction holes 62*a* in the first suction rod 60*a*, and diamonds represent an example arrangement of the suction holes 62*b* in the second suction rod 60*b* opposite to the first suction rod 60*a*.

As described above, the four suction rods 60 are elongated members that hold one side or the other side of the label L by suction. All four of the suction rods 60 have substantially the same configuration. More specifically, each suction rod includes an outer pipe 64 which is a hollow pipe having a substantially square cross section, and an inner pipe 61 inserted and fitted within the outer pipe 64.

The inner pipe 61 is a closed hollow pipe which is in communication with a suction pump which is not illustrated. In a portion of this inner pipe 61 which is opposite to other suction rods 60, a slit 61*a* extending in the major axis direction is formed. The suction holes 62 formed in the outer pipe 64 are in communication with the hollow portion of the inner pipe 61, and more particularly, with the suction pump, through this slit 61*a*.

The outer pipe 64 includes a through hole formed in the center thereof having a diameter which is substantially the same as the outer diameter of the inner pipe 61, and the inner pipe 61 is inserted and fitted into the through hole. On at least a surface of the outer pipe 64 that is opposite to another suction rod 60, a plurality of suction holes 62 are formed as so to be arranged in a line. The label L is held by the suction rods 60 by suction via these plural suction holes 62. Hereinafter, the array of these plural suction holes 62 will be referred to as "a suction hole array". In particular, the suction hole array formed in the first suction rod 60*a* will be referred to as "the first suction hole array" and the suction hole array formed in the second suction rod 60*b* will be referred to as "the second suction hole array".

The suction hole array is configured such that the suction hole array, when opposite to the opposing suction rod 60 in the vicinity thereof, is at least partially non-parallel to the suction hole array formed in this opposing suction rod 60. More specifically, in the present embodiment, as illustrated in FIG. 8, a plurality of suction holes 62*a* are arranged in the first suction rod 60*a* in a line which is inclined from right to left toward the lower portion (a two-dot chain line in FIG. 8), and a plurality of suction holes 62*b* are arranged in the second suction rod 60*b* that is opposite to the first suction rod 60*a* in a line which is inclined from left to right toward the lower portion (a dashed line in FIG. 8). In other words, the suction holes 62 of each suction rod 60 is formed such that a line formed by connecting the suction holes 62*a* formed in the first suction rod 60*a* sequentially from the top and a line formed by connecting the suction holes 62*b* formed in the second suction rod 60*b* opposite the first suction rod 60*a* sequentially from the top intersect with each other in substantially an X shape. Further, in the present embodiment, the suction holes 62 are formed such that the suction holes 62*a* in the first suction rod 60*a* and the suction holes 62*b* in the second suction rod 60*b* are shifted from each other not only in the width direction of the label but also in the height direction of the label.

Further, the outer pipe 64 according to the present embodiment is divided into a first pipe 64*k*, a second pipe 64*m*, and a third pipe 64*n*, sequentially from the top. The suction hole arrays are formed on three side surfaces of the first pipe 64*k* and on four side surfaces of the second pipe 64*m*. The suction hole arrays formed on the three side surfaces of the first pipe 64*k* have mutually different array lengths, and the suction hole arrays formed on the four side surfaces of the second pipe 64*m* also have mutually different array lengths. The first pipe 64*k* and the second pipe 64*m* are independently rotatable in the major axis direction, such that the surface opposite to the opposing suction rod 60, or, by extension, the suction hole array in communication with the hollow portion of the inner pipe 61 and the suction pump, can be changed. In other words, in the present embodiment, the length of the suction hole array that is conducive to label suction can be selectively changed.

As is clear from the above description, in the present embodiment, the label L is held by suction by the arrays of a plurality of suction holes 62 arranged in the vertical direction. In other words, in the present embodiment, the label is held in a substantially linear shape by the suction holes 62 arranged in arrays. With this configuration, it is possible to hold the label in a more stable manner. This advantage will be described below in comparison with the conventional art.

Figure 19:
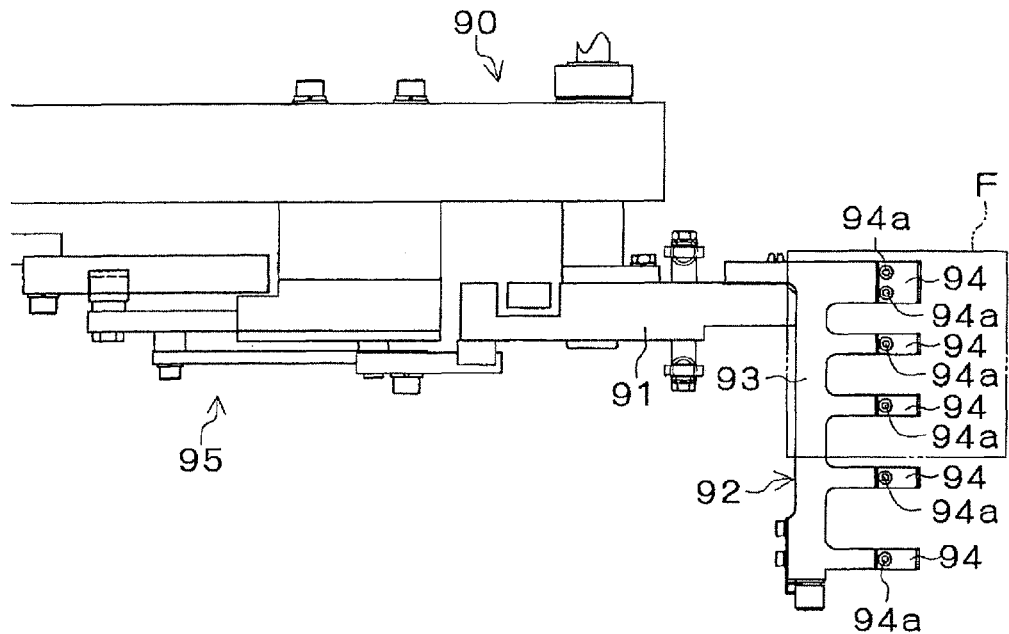
FIG. 19 Front view illustrating a conventional label opener.
Figure 20:
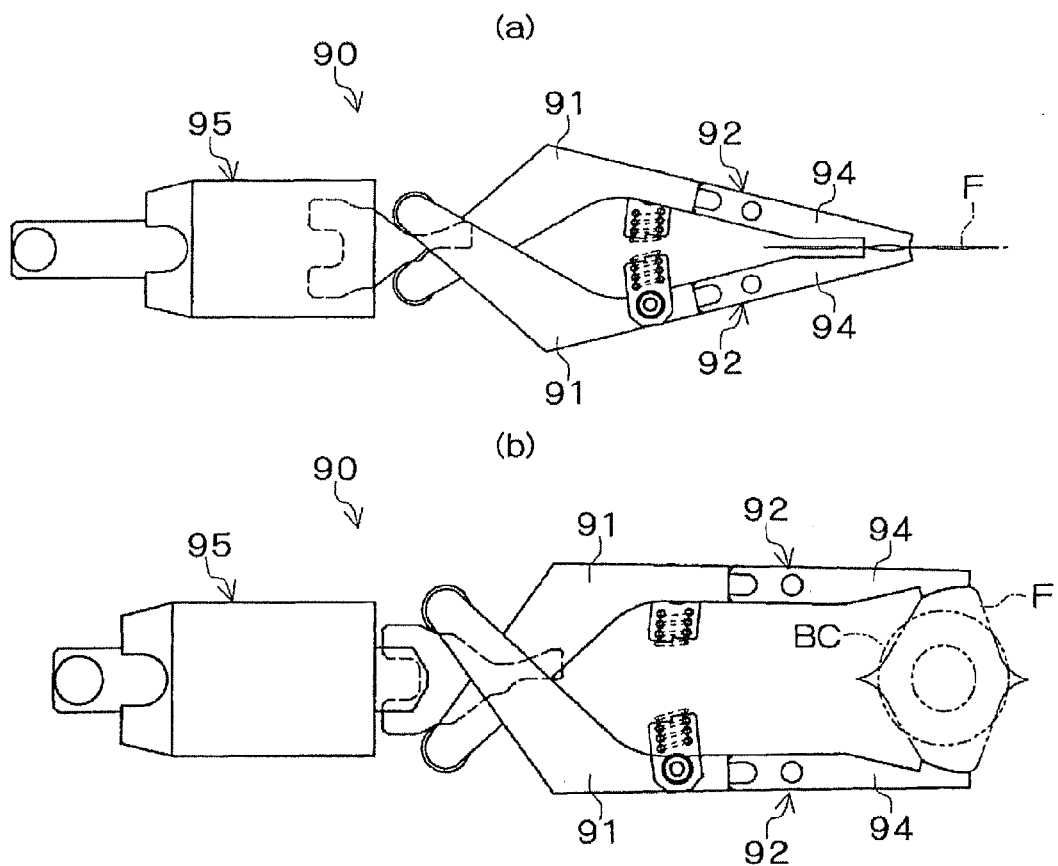
FIG. 20 Top view illustrating a conventional label opener.

FIG. 19 is a front view of a conventional label opener 90 which is disclosed in Patent Literature 3 or the like, and FIG. 20 is a top view schematically illustrating the label opener 90. As illustrated in FIG. 19, many of the conventional label openers 90 include a plurality of pairs of grip arms 94 that sandwich the label F by suction in the height direction of the label. The pair of grip arms 94 can be expanded or contracted with respect to each other.

In this label opener 90, among the plurality of pairs of grip arms 94, pairs of grip arms 94 that are conducive to suction of the label can be switched as appropriate in accordance with the length of the label F which is actually to be opened in the height direction thereof, such that the label F can be gripped by suction in the vicinity of the upper end and the vicinity of the lower end, even if the length of the label in the height direction varies. In other words, according to this prior art, a total of four portions of the label, including a potion in the vicinity of the upper end of one side, a portion in the vicinity of the lower end of one side, a potion in the vicinity of the upper end of the other side, a portion in the vicinity of the lower end of the other side, are gripped by suction.

Further, in another conventional art label opener which is disclosed in Patent Literature 4 or the like, two pairs of adsorption members, that are capable of holding both sides of the label by adsorption and are also expandable, are provided in the width direction of the label. Accordingly, with this label opener, the label is held by adsorption at four locations that are spaced in the width direction.

As such, in the conventional label openers, the number of locations where the label is adsorbed is limited. Therefore, in order to secure a sufficient adsorption force, it is likely that the adsorption hole will have a large diameter. Here, when the adsorption hole has a large diameter, there is a case in which a portion of the label is sucked into the adsorption hole, leading to a problem that the shape of an opening is not stable and that, due to a gap (leak) formed between the hole and the label, a sufficient suction force cannot be obtained. Another problem may arise that when opening the label with the label opener, portions of the label that are not adsorbed are difficult to open due to the influence of a vacuum inside the label. These problems occur particularly noticeably in a limp thin label having a small thickness.

On the other hand, according to the present embodiment, as described above, the label L is held by suction with a plurality of suction holes 62 arranged in the vertical direction. As the label L is held by a plurality of suction holes 62 by suction, a sufficient holding force can be obtained even if each of the suction holes 62 is small. As a result, sucking of the label L into the suction holes 62 can be effectively prevented. Further, as both ends of the label L in the width direction are sucked by a plurality of suction holes 62 in a substantially linear manner, the problem in which portions of the label that are not adsorbed are difficult to open due to the influence of a vacuum inside the label can be effectively prevented.

Also, in the present embodiment, the positions of the suction holes 62 formed in the suction rods 60 that are opposite to each other are slightly shifted. According to an experiment performed by the applicant, with such a configuration, two overlapping films forming the folded label L can be separated from each other more easily, so that the sheet-shape label L can be opened more appropriately.

Figure 9A:
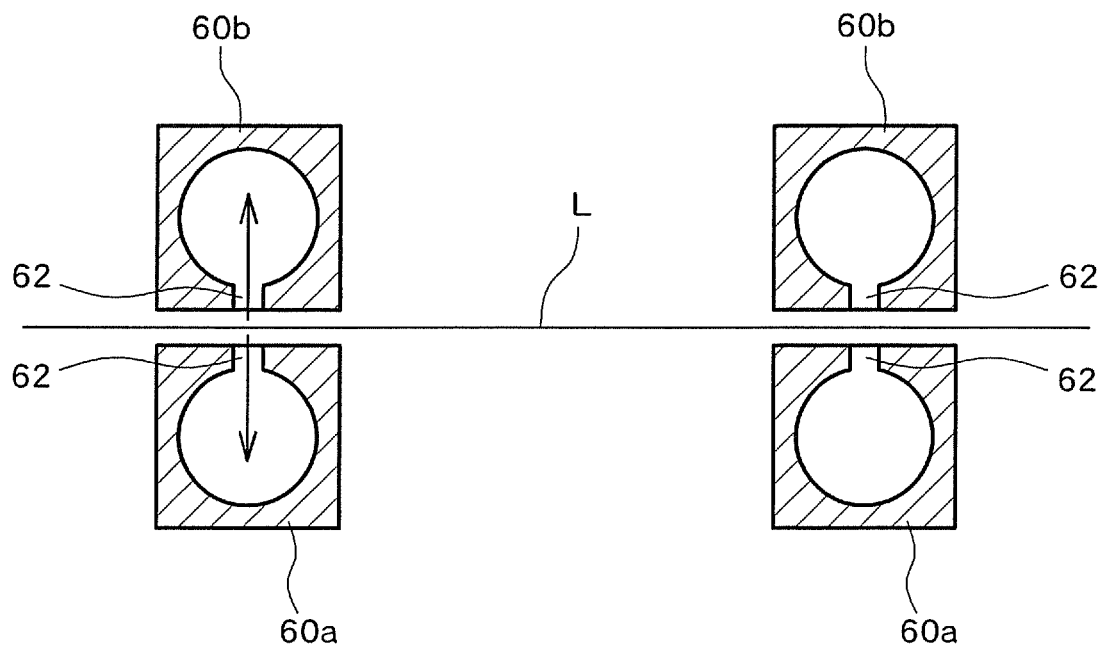
FIG. 9a Image view illustrating how the label is sucked by the suction rod in another example.
Figure 9B:
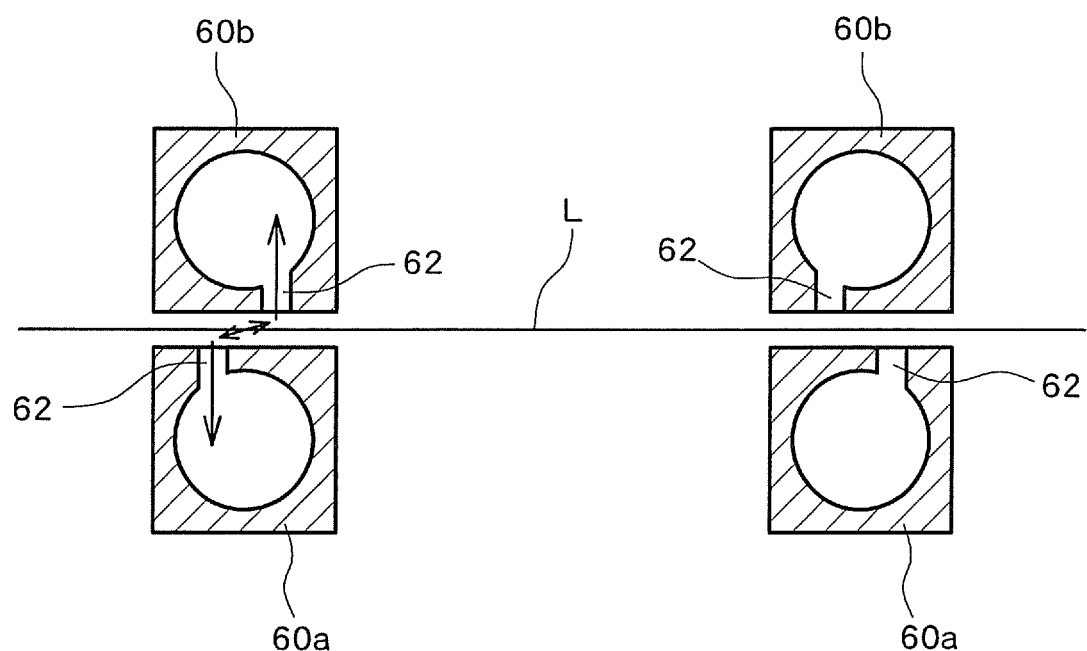
FIG. 9b Image view illustrating how the label is sucked by the suction rod.

While precise reasons why such an advantage can be achieved are not known, it can be assumed that by slightly shifting the positions of the suction holes 62, a force in the plane direction of the film acts on the film. This will be described with reference to FIGS. 9a and 9b. FIGS. 9a and 9b are image views illustrating how both sides of the sheet-like label L are sucked and opened, in which the view in FIG. 9a illustrates a case in which the positions of the suction holes 62 that are opposite to each other substantially match, and the view in FIG. 9b illustrates a case in which the positions of the suction holes 62 that are opposite to each other are shifted from each other.

As described above, the label L, before being opened, is folded into a sheet shape. At this time, two films forming the label L are overlapped in a closely adhered state. As illustrated in FIG. 9a, when attempting to move the suction rods 60a and 60b away from each other while substantially the same positions of these two films are being sucked by these suction rods 60a and 60b, only the force in the direction orthogonal to the surface of the film acts on each film. In this case, it can be assumed that as the forces acting on both films are balanced, the two films cannot be separated from each other easily.

On the other hand, when the positions of the suction holes 62 for sucking the both films are shifted from each other as illustrated in FIG. 9b, each of the films is pulled in the direction orthogonal to the film surface by the suction hole 62 contacting the film and is simultaneously pulled by the suction hole 62 on the opposite side which is slightly shifted. In other words, the force in the direction of the plane of the film also acts on each film forming the label L. It can be assumed that with this force in the plane direction acting on the films, the films move slightly in the lateral direction as well, collapsing the balanced state of the force, so that the films can be separated from each other easily.

As such, by shifting the positions of the suction holes 62 formed in the opposing suction rods 60 from each other as in the present embodiment, it is possible to open the sheet-like label L more appropriately. Here, while in the present embodiment the first suction hole array and the second suction hole array are formed in a substantially X shape, other arrangements may be adopted as long as the first suction hole array and the second suction hole array are at least partially nonparallel with each other.

FIG. 10 includes views illustrating example arrangements of the suction hole arrays. In FIG. 10, a two-dot chain line indicates a line (first hole array line) formed by connecting the suction holes 62a formed in the first suction rod 60a sequentially from the top and a dashed line indicates a line (second hole array line) formed by connecting the suction holes 62b formed in the second suction rod 60b opposite the first suction rod 60a sequentially from the top.

Figure 10C:
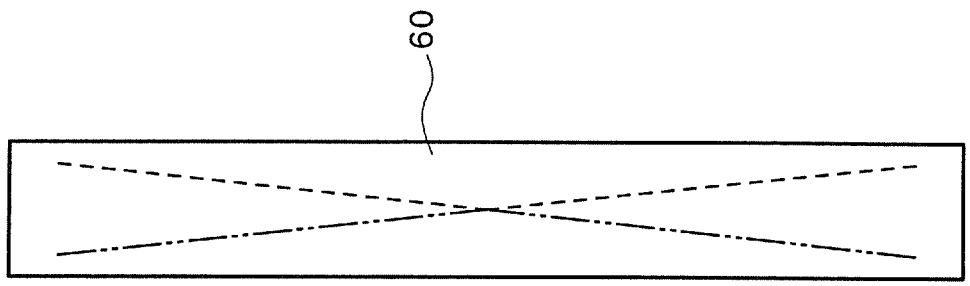
FIG. 10c View illustrating still another example arrangement of suction hole arrays in the suction rod.
Figure 10B:
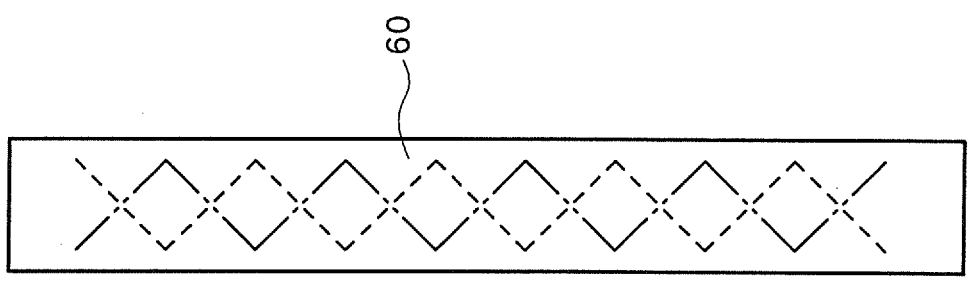
FIG. 10b View illustrating another example arrangement of suction hole arrays in the suction rod.
Figure 10A:
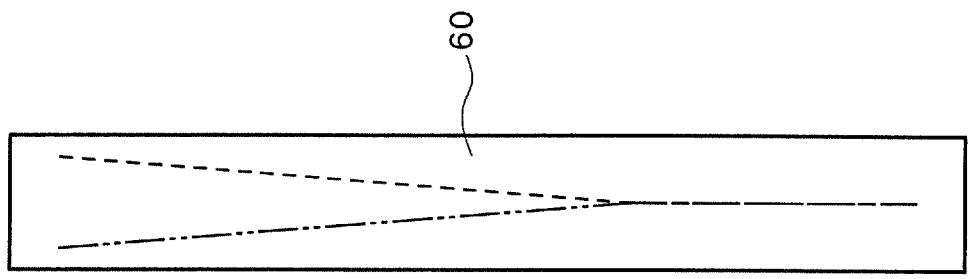
FIG. 10a View illustrating an example arrangement of suction hole arrays in the suction rod.

While in the above example the suction holes 62 are arranged such that the first hole array line and the second hole array line are straight lines intersecting each other, the suction holes 62 may be arranged such that the first hole array line has a substantially ">" shape and the second hole array line has a substantially "<" shape which is symmetrical with respect to the first hole array line, as illustrated in FIG. 10a. Further, the suction holes 62 may be arranged such that the first hole array line and the second hole array line intersect in a zigzag manner, as illustrated in FIG. 10b. Further, because the first hole array line and the second hole array line need to be nonparallel to each other at least partially, the suction holes 62 may be arranged such that the first hole array line and the second hole array line form a substantially Y shape, as illustrated in FIG. 10c. Also, while in the above example the positions of the suction holes 62 are also shifted from each other in the height direction of the label, the positions need not be always shifted. However, in order to open the label in a stable manner, it is desirable to arrange the suction holes 62 such that the first hole array line and the second hole array line are symmetrical with respect to each other.

Figures 11A, 11B, 11C, 11D:
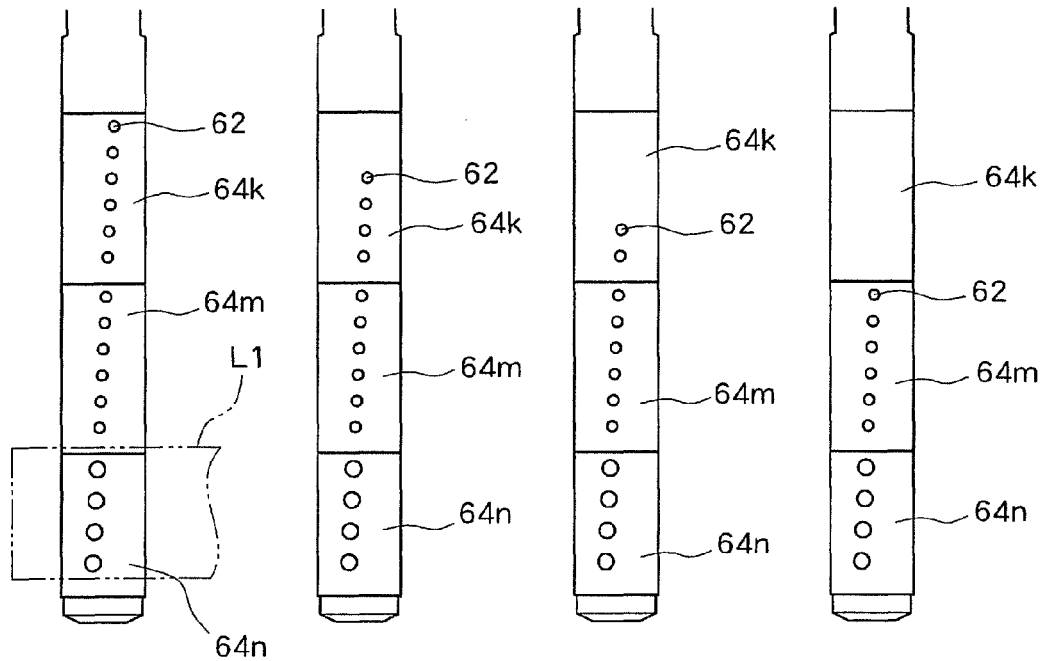
FIG. 11a View illustrating how the length of a suction hole array that is conducive to suction is changed.
FIG. 11b View illustrating how the length of a suction hole array that is conducive to suction is changed.
FIG. 11c View illustrating how the length of a suction hole array that is conducive to suction is changed.
FIG. 11d View illustrating how the length of a suction hole array that is conducive to suction is changed.
Figures 11E, 11F, 11G, 11H:
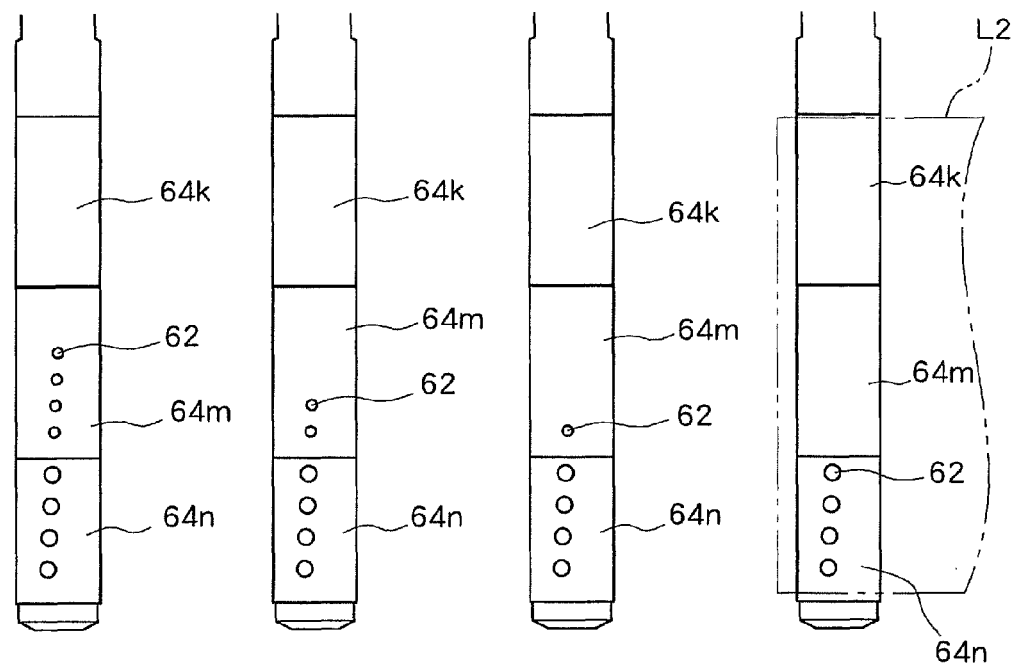
FIG. 11e View illustrating how the length of a suction hole array that is conducive to suction is changed.
FIG. 11f View illustrating how the length of a suction hole array that is conducive to suction is changed.
FIG. 11g View illustrating how the length of a suction hole array that is conducive to suction is changed.
FIG. 11h View illustrating how the length of a suction hole array that is conducive to suction is changed.

As is well known, the lengths of labels L in the height direction thereof that are currently being handled are not uniform, and labels L with different lengths are known in accordance with the type of corresponding articles. It is therefore necessary to switch the length of the suction hole arrays conducive to suction, in accordance with such a difference in the length of the label L in the height direction, in order to prevent a deficiency in holding the label L or a leak during the suction of the label L. Specifically, if the suction hole array that is conducive to suction is short although the length of the label L2 in the height direction thereof is long, as illustrated in FIG. 11b, the upper side or the lower side of the label L2 is not held by suction so that a portion of the label hangs down or the label cannot be opened. Conversely, if the suction hole array that is conducive to suction is long although the length of the label L1 in the height direction thereof is short, as illustrated in FIG. 11a, a leak state in which a portion of the suction holes 62 is not covered with the label L1 and exposed is generated, which leads to a problem that a sufficient suction force cannot be secured.

Therefore, according to the present embodiment, the suction hole array that is conducive to suction of the label can be changed by forming the suction hole arrays having different array lengths on two or more side surfaces of each suction rod 60 and rotating the suction rod 60 about the major axis thereof to thereby switch the opposing surfaces. This structure makes it possible to correspond to labels L having different lengths in the height direction thereof. Further, in the present embodiment, each suction rod 60 is divided into a plurality of (three in the present embodiment) sections in the height direction thereof that can rotate about the major axis independently. With this structure, the total length of the suction hole array that is conducive to suction can be changed in more stages so as to correspond a greater variety of labels.

FIGS. 11a to 11h illustrate how the length of the suction hole array that is conducive to suction is changed in the present embodiment. In the present embodiment, as the first pipe 64k is rotated about the major axis, the height of the upper end of the suction hole array formed therein is gradually lowered, as illustrated in FIGS. 11a to 11d. Similarly, as the second pipe 64m is rotated about the major axis, the height of the upper end of the suction hole array formed therein is gradually lowered, as illustrated in FIGS. 11e to 11h. By changing the combination of the opposing surfaces of the first pipe and the second pipe in accordance with the length of the label to be handled in the height direction thereof, it is possible to hold and open a greater variety of labels L in a stable manner. Further, in the present embodiment, the length of the suction hole array is changed by rotation of the pipe that can be visually recognized by the user, that is, the outer pipe 64. With this structure, it is possible to effectively prevent an error in selecting the length of the suction hole array.

While in the present embodiment the outer pipe 64 has a cross section having a substantially square shape, the shape of the cross section may be formed as a polygon having more surfaces (such as pentagon and hexagon) so that the total length of the suction hole array that is conducive to suction can be changed in more stages. Further, while in the present embodiment the third pipe 64n is non-rotational, the third pipe can also be configured to be rotatable and can have suction hole arrays having different lengths formed on each side surface thereof.

Next, the rod elevator mechanism will be described with reference to FIG. 7. As described above, the rod elevator mechanism is a mechanism that moves the four suction rods 60 upward and downward in accordance with the state of the fitting processing. The rod elevator mechanism has a configuration which is substantially the same as that of the take-up elevator mechanism. Specifically, the rod elevator mechanism includes a cam slot 83b (see FIG. 6) formed in a lower side cam columnar member 39d, a cam block 83a fitted in the cam slot 83b, a linear guide 22 for guiding a upward and downward operation and a base plate 67, a coupling member 69 for coupling the base plate 67 and the four suction rods 60, and so on. The lower side cam columnar member 39d is a substantially columnar member provided concentrically with the rotational shaft O1, and includes the cam slot 83b that defines the elevated state of the four suction rods 60. The cam block 83a is a block member fitted into the cam slot 83b, and moves upward and downward along the cam slot 83b with the movement of the fitting head 6 (and the opener mechanism 50, by extension) along the annular transport path. This upward and downward operation of the cam block 83a is transmitted to the four suction rods 60 via the base plate 67 and the coupling member 69.

Figure 12:
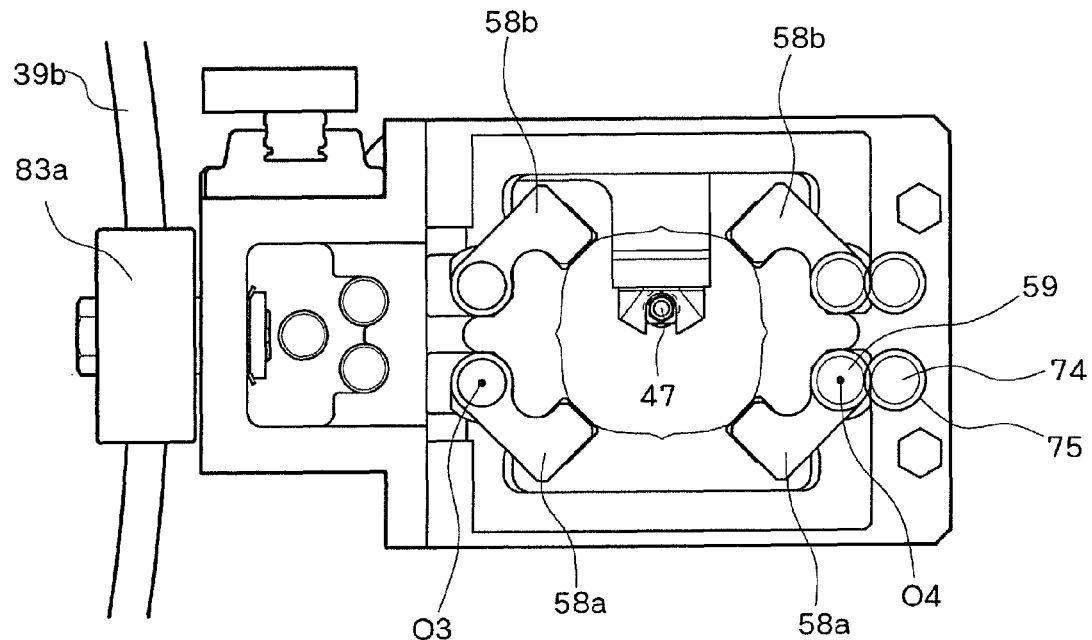
FIG. 12 Cross sectional view taken along line X-X in FIG. 7.
Figure 13:
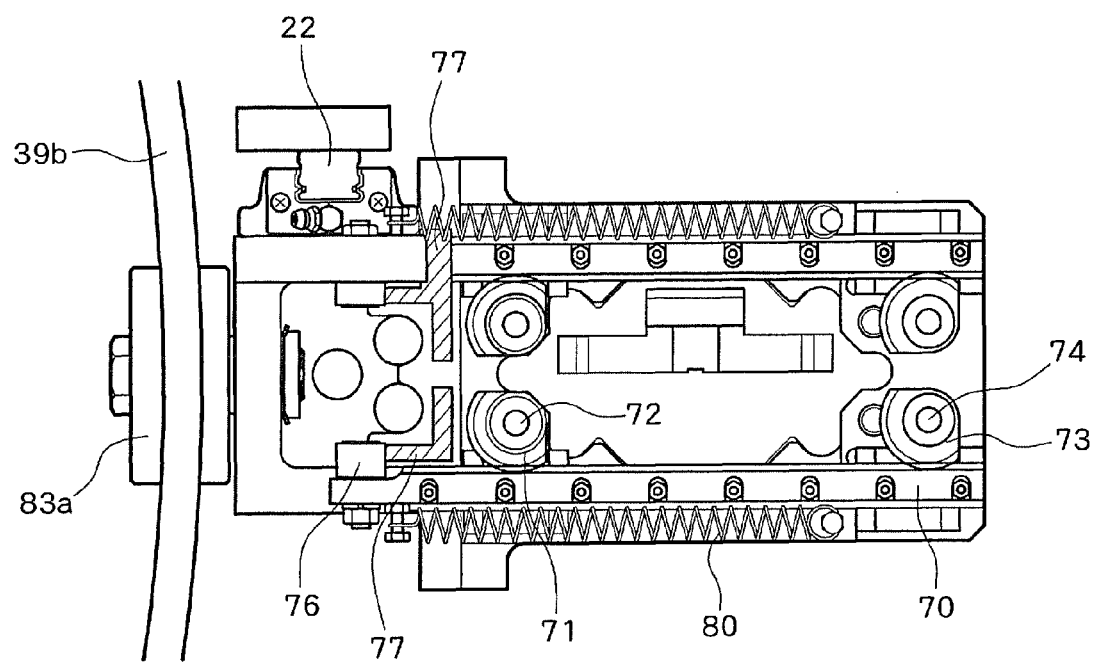
FIG. 13 Cross sectional view taken along line Y-Y in FIG. 7.

Next, the rod driving mechanism will be described with reference to FIGS. 7, 12, and 13. FIG. 12 is a cross sectional view taken along line X-X in FIG. 7, and FIG. 13 is a cross sectional view taken along line Y-Y in FIG. 7. As described above, the rod driving mechanism is a mechanism for moving the mutually opposing suction rods 60 toward or away from each other in accordance with the state of the fitting processing. The rod driving mechanism is further divided into a first rod driving mechanism that moves the first suction rod 60a and a second rod driving mechanism that moves the second suction rod 60b. As the first rod driving mechanism and the second rod driving mechanism have substantially the same structure, only the structure of the first rod driving mechanism will be described below. The first rod driving mechanism includes a support arm 58a, an upper side cam columnar member 39u, a cam block 81a, transmission members, and so on. The upper side cam columnar member 39u is a substantially columnar member provided concentrically with the rotation shaft O1 and includes a cam slot 81b (see FIG. 6) formed on a surface thereof, that defines the state of movement of the first suction rod 60a. The cam block 81a is a block member fitted into this cam slot 81b, and moves upward and downward along the cam slot 81b, with the movement of the fitting head 6 (and the opener mechanism 50, by extension) along the annular transport path. This upward and downward movement of the cam block 81a is converted into a rotation movement by the transmission members and then transmitted to the support arm 58a that holds the first suction rod 60a. These transmission members first convert the upward and downward movement of the cam block 81a into a forward and backward movement within a horizontal plane by a cam plate 77, a cam follower 76, and a coil spring 80, and then transmit the forward and backward movement to a rack 70. The cam plate 77 is a plate member coupled to the cam block 81a and has a substantially triangular shape with the width thereof decreasing toward the lower end. The cam follower 76 is in contact with the side end surface of this cam plate 77 and is also fixed to the rack 70. When the cam plate 77 moves downward to push the cam follower 76 in the left direction in FIG. 13, the rack 70 also moves in the left direction of the figure. Further, the coil spring 80 that urges the rack 70 in the right direction of FIG. 13 is coupled to the rack 70, such that, when the cam plate 77 moves upward, the rack 70 returns back in the right direction of the figure.

This forward and backward movement of the rack 70 is transmitted, via four pinions 71, 73, 75, and 59 and coupling shafts 72 and 74, to the two support arms 58a as a rotational movement. Specifically, the first pinion 71 and the second pinion 73 are engaged with the rack 70. The rotation of the first pinion 71, of these pinions, is transmitted to one support arm 58a on the left side in the figure via the coupling shaft 72. On the other hand, the rotation of the second pinion 73 is transmitted to the third pinion 75 via the rotational shaft 74. The rotation transmitted to the third pinion 75 is converted into a rotation in the reverse direction by a fourth pinion 59 engaging the third pinion 75, and is then transmitted to the support arm 58a on the right side of the figure. With such a configuration, when the cam plate 77 moves downward to move the rack 70 in the left direction in FIG. 13, the first suction rod 60a moves away from the second suction rod 60b, whereas when the cam plate 77 moves upward to move the rack 70 in the right direction in FIG. 13, the first suction rod 60a moves close to the second suction rod 60b.

As is clear from the above description, according to the present embodiment, by changing the contact relationship between the cam plate 77 and the cam follower 76, the amount of movement of the suction rods 60 is changed. The contact relationship between the cam plate 77 and the cam follower 76 can be changed in accordance with the relative height of the upper side cam columnar member 39u (and the cam slot 81b, by extension) with respect to the lower side cam columnar member 39d. In other words, in the present embodiment, the amount of movement of the suction rods 60 can be changed simply by moving the upper side cam columnar member 39*u*, or the cam slot 81*b* by extension, upward or downward relative to the lower side cam columnar member 39*d*.

Figure 21:
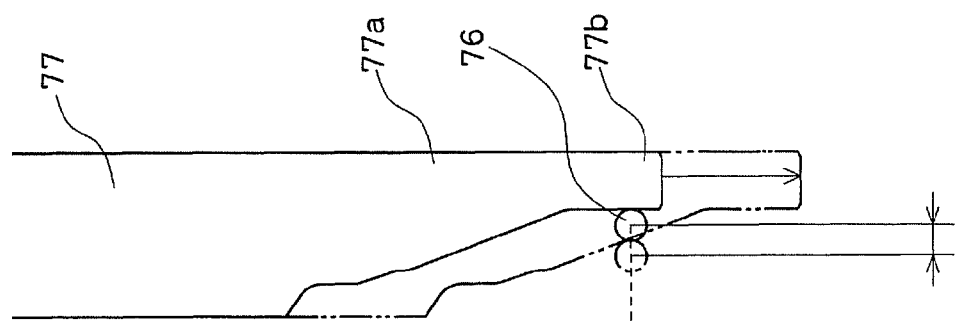
FIG. 21 View illustrating a relationship between the initial height of a cam plate and the contact state between the can plate and a cam follower.
Figure 21:
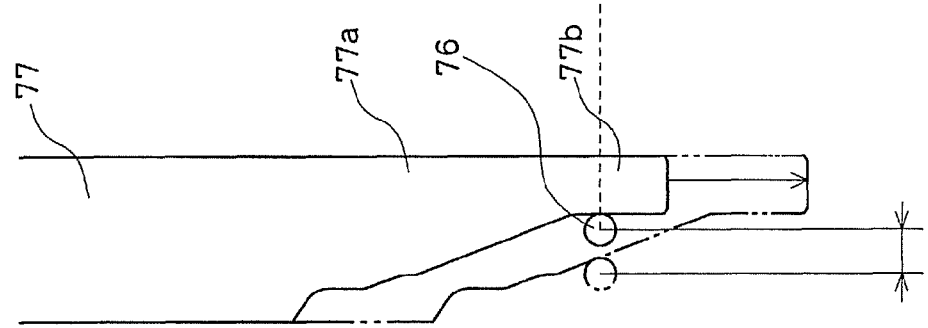

The above mechanism will be described with reference to FIG. 21. FIG. 21 is a view illustrating the contact relationship between the cam plate 77 and the cam follower 76. As described above, the cam plate 77 has a substantially triangular shape with the width thereof decreasing toward the leading end. More accurately, however, as illustrated in FIG. 21, the cam plate 77 has a shape formed by connecting a straight portion 77*b* having a fixed width to the leading end of the tapered portion 77*a* of a substantially triangular shape with the width thereof decreasing toward the leading end, as illustrated in FIG. 21.

While the cam follower 76 is in contact with the straight portion 77*b*, the suction rod 60 is close to the opposing suction rod 60 and is in a closed state. On the other hand, when, with the lowering of the cam plate 77, the cam follower 76 comes in contact with the tapered portion 77*a* and moves toward the left side in the figure, the suction rod 60 moves away from the opposing suction rod 60 and is placed in an opened state.

Here, effects of the variation of the initial height of the cam plate 77 with respect to the cam follower 76 (or the initial height of the upper cam columnar member 39*u* with respect to the lower cam columnar member 39*d*, by extension) on the amount of movement of the cam follower 76, or on the amount of movement of the suction rods 60, will be described. As illustrated in FIG. 21, when the initial height of the cam plate 77 is low (that is a case illustrated in the left side of the figure), with the downward movement of the cam plate 77, the cam follower 76 immediately comes into contact with the tapered portion 77*a*. As a result, when the initial height of the cam plate 77 is low, the amount of movement of the cam follower 76 in the left direction, or the amount of movement of the suction rods 60 by extension, becomes greater if the amount of downward movement is the same. On the other hand, when the initial height of the cam plate 77 is high (that is a case illustrated in the right side of the figure), the range of the tapered portion 77*a* that the cam follower 76 comes in contact with is small. As a result, when the initial height of the cam plate 77 is high, the amount of movement of the cam follower 76 in the left direction, or the amount of movement of the suction rods 60, by extension, becomes smaller if the amount of downward movement is the same.

As such, according to the present embodiment, the amount of movement (the amount of opening) of the suction rods 60 can be changed by changing the initial height of the cam plate 77. The initial height of the cam plate 77 can be changed by moving the upper cam columnar member 39*u* upward with respect to the lower cam columnar member 39*d*. Here, as the upper side cam columnar member 39*u* is shared by a plurality of fitting heads 6, the amount of movement of the suction rods 60 in the plurality of fitting heads 6 can be collectively changed simply by moving a single upper cam columnar member 39*u* upward or downward. It is therefore possible to process labels with different diameters (the length in the width direction) easily.

Figure 14A:
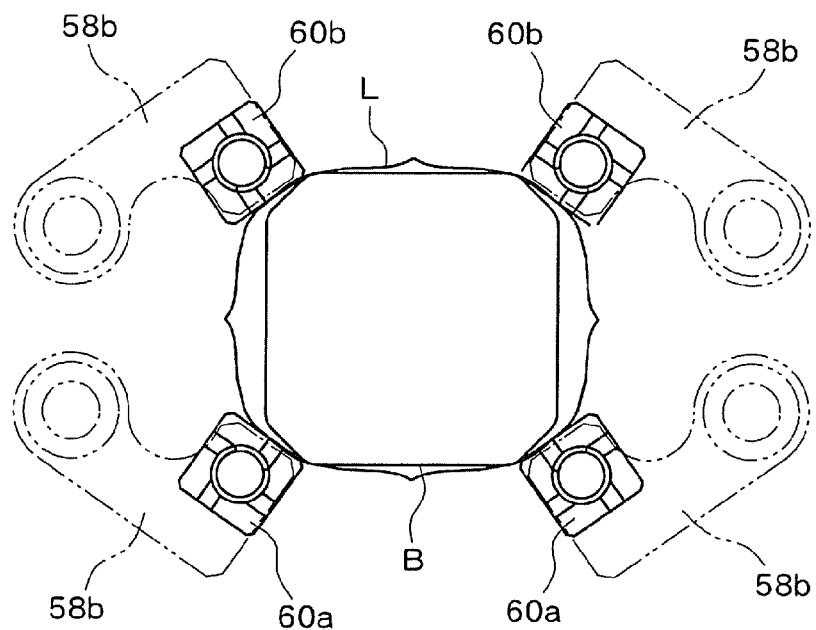
FIG. 14a View illustrating how the label is opened.
Figure 14B:
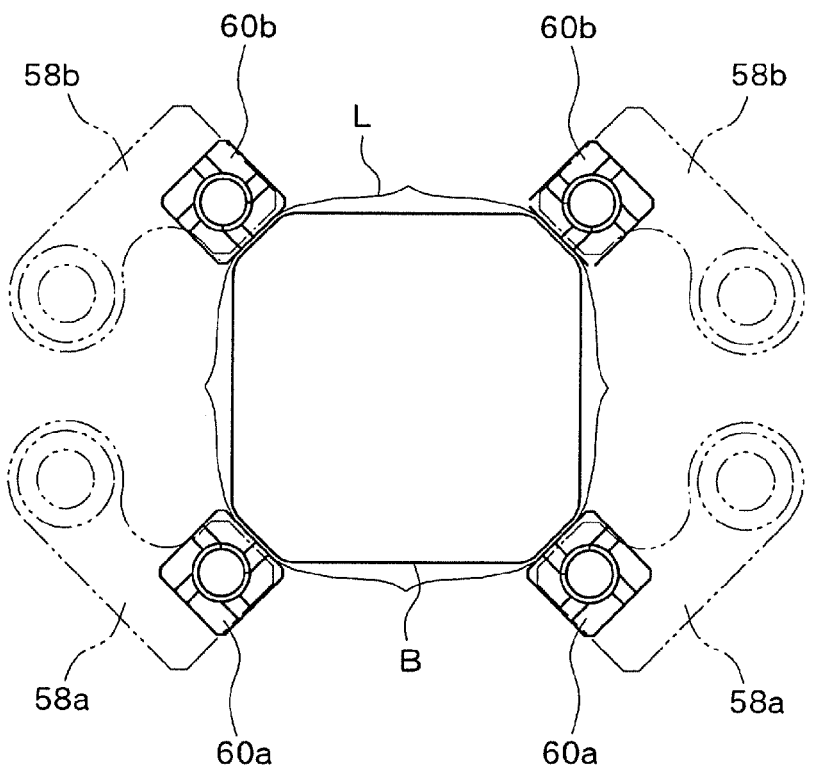
FIG. 14b View illustrating another example of how the label is opened.

More specifically, as has been known, the diameters of the labels L being currently dealt with are not uniform, and labels with various diameters are known in accordance with the type of article to which the label L is to be fitted. In order to open the label L appropriately, it is necessary vary the amount of movement of the suction rods 60 in accordance with the diameter of the label L. For example, in order to open the label L having a rather small diameter as illustrated in FIG. 14*a*, it is necessary to set the amount of movement of the suction rods 60 (the amount of turn of the support arms 58*a* and 58*b*) rather small as well. On the other hand, in order to open the label L having a rather large diameter as illustrated in FIG. 14*b*, it is necessary to set the amount of movement of the suction rods 60 (the amount of turn of the support arms 58*a* and 58*b*) rather large as well. According to the present embodiment in which the amount of movement of the suction rods 60 can be varied by the upward or downward movement of the upper side cam columnar member 39*u*, it is possible to easily deal with such a change of the diameter of the label L. Here, naturally, it is also possible to change the amount of movement of the suction rods 60 by varying the number of gears of the pinions 71, 73, 75, and 59 or of the rack 70 described above, rather than changing the relative height of the upper side cam columnar member 39*u*. However, as the pinions 71, 73, 75, and 59 and the rack 70 are provided for each fitting head 6, contrary to the upper side cam columnar member 39*u*, it is necessary to replace these components for all the fitting heads 6 in order to vary the amount of movement of the suction rods 60, which is laborious. On the other hand, with the structure in which the upper side cam columnar member 39*u* which is shared by the plurality of fitting heads 6 is moved upward or downward with respect to the lower cam columnar member 39*d*, as in the present embodiment, such labor caused by replacement of the components can be significantly reduced.

Figure 22:
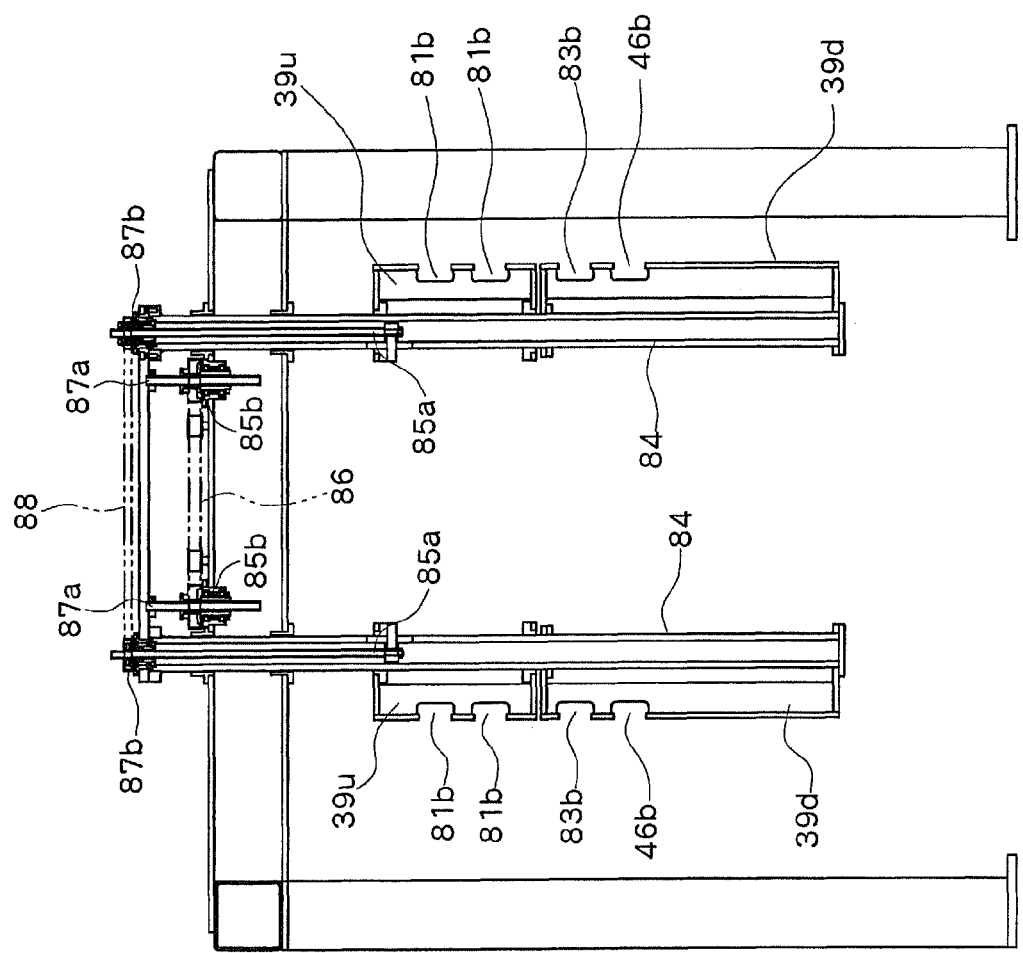
FIG. 22 View for explaining the elevator mechanism of a cam cylinder.

The mechanism for moving the upper side columnar member 39*u* upward and downward with respect to the lower side cam columnar member 39*d* will be briefly described with reference to FIG. 22. As illustrated in FIG. 22, both the upper side columnar member 39*u* and the lower side columnar member 39*d* are support by a support member 84. With the upward and downward movement of this support member 84, the upper side columnar member 39*u* and the lower side columnar member 39*d* move synchronously. The support member 84 moves upward and downward by moving a belt 86 in a circulatory fashion in accordance with driving a motor (not shown). More specifically, with the circulating movement of the belt 86, screws 87*a* over which the belt 86 is mounted rotate. The screw 87*a* is screwed into a nut 85*b* fixed to a frame and moves upward and downward with the rotation thereof. Then, the support member 84 moves upward and downward with the upward and downward movement of the screw 87*a*. As described above, by allowing the upper side cam columnar member 39*u* and the lower side cam columnar member 39*d* to move upward and downward synchronously, it is possible to vary the height of the target body B to be handled and the height of label fitting.

Further, the upper side cam columnar member 39*u* is coupled to the support member 84 via an elevator member 85, and by moving the elevator member 85 upward and downward with respect to the support member 84, it is possible to move the upper side cam columnar member 39*u* upward and downward relative to the lower side cam columnar member 39*d*. The elevator member 85 is configured to move upward and downward by moving a belt 88 in a circulatory fashion in accordance with driving of a motor (not shown). More specifically, with the circulating movement of the belt 88, screws 85*a* over which the belt 88 is mounted rotate. The screw 85*a* is screwed into a nut 87*b* fixed to the support member 84 and moves upward and downward with the rotation thereof. Then, the upper side cam columnar member 39*u* moves upward and downward with respect to the lower side cam columnar member 39*d* with the upward and downward movement of the screw 85*a*. As a result, the amount of movement of the suction rods 60 can be changed. Here, the elevator mechanism described above is only an example, and other structures may also be adopted as long as it is possible to move the upper side cam columnar member 39*u* upward and downward relative to the lower side cam columnar member 39*d*.

[Flow of Label Fitting Processing]

Finally, with reference to FIGS. 15 and 16, a flow of label fitting processing will be described. FIGS. 15 and 16 illustrate the state of the fitting head 6 at each of the positions S1 to S8 (see FIG. 2). Further, each figure schematically illustrates, in the upper level, a top view of the suction rods 60 at each position.

Figure 15B:
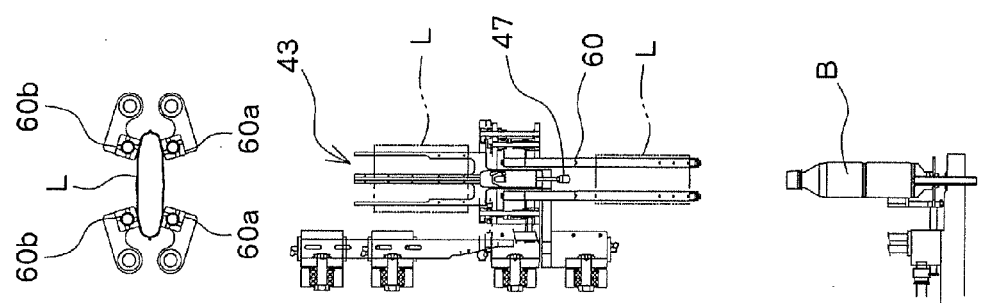
FIG. 15b View illustrating the state of the fitting head at position S2.
Figure 15A:
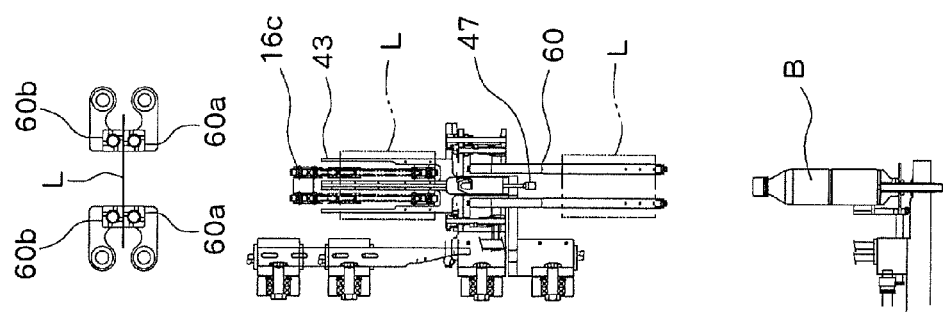
FIG. 15a View illustrating the state of the fitting head at position S1.

As illustrated in FIG. 15*a*, when the fitting head 6 reaches the label supply position S1, the take-up member 43 moves upward to a height at which the fitting head 6 can pass close to the lower side feed belt 16*c* and starts a suction operation to suck the label L folded into a sheet shape from the feed belt 16*c* and hold the label L. Then, the take-up member 43, in this state, moves in the vertical direction on the sheet plane, thereby removing and receiving the label L from the lower side feed belt 16*c*. On the other hand, the first suction rod 60*a* and the second suction rod 60*b*, that are in a close and opposite state with each other, hold, by suction, both sides of another label L which has been received from the take-up member 43 previously at a position above the target body B.

Thereafter, as illustrated in FIG. 15*b*, the first suction rod 60*a* and the second suction rod 60*b*, while holding both sides of the label L by suction, move in the directions away from each other to thereby open the label L folded in a sheet shape into a cylindrical shape.

Then, when the label L is completely opened, the four suction rods 60 move downward toward the target body B placed on the mounting base 31, and finally carry the label L to a height at which the fitting operation can be regarded as having been completed. With this downward movement, the cylindrical label which is held by the four suction rods 60 by suction is disposed around the target body B and is placed in a fitted state.

As described above, by transporting the label L to the fitting height while holding the label L with the four suction rods 60, it is possible to perform the fitting processing properly even if the label L is thin. More specifically, many of the conventional label fitting devices are configured such that the label is moved downward by an opener, mandrel, or the like, to the middle of the target body, and thereafter the upper edge of the label is pressed by some pressing member to thereby press the label down to the fitting height. However, if such a press down method is adopted when the label is thin and limp, the label is bent or curled at the time of pressing down, leading to a problem that the label fitting cannot be performed properly. According to the present embodiment, on the other hand, because the label L is transported to the predetermined fitting height while holding the label L with the four suction rods 60, a problem of bending or curling of the label, even if the label is thin, is unlikely to arise. As a result, the fitting processing can be performed properly even for a thin label L.

In this case, however, there arises a problem that as a recess portion or the like for housing the target body B cannot be provided on the upper surface of the mounting base 31 in order to prevent interference with the suction rod 60 which is moving down, misalignment of the target body B is likely to occur. Accordingly, in the present embodiment, when moving the suction rods 60 downward, the take-up member 43 and also the head holding member 47 coupled to the take-up member 43 are also moved downward. With this downward movement, the head holding member 47 comes in contact with the head portion of the target body B, thereby pressing the target body B onto the mounting base 31. Thus, the misalignment or dropping of the target body, and so on, can be effectively prevented.

Figure 16C:
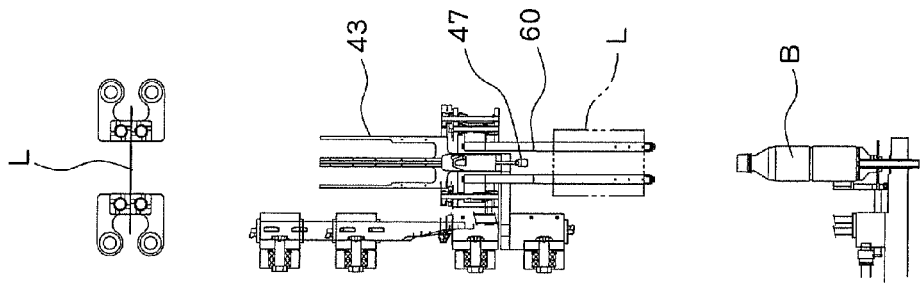
FIG. 16c View illustrating the state of the fitting head at position S6.

When fitting of the label L is completed, the suction rods 60 stop the sucking operation to thereby release holding of the label L. Then, as illustrated in FIG. 16*a*, the four suction rods 60 move upward to substantially the same height as the take-up member 43, which is above the target body B, in a state in which the opposing suction rods remain spaced from each other.

Figure 16B:
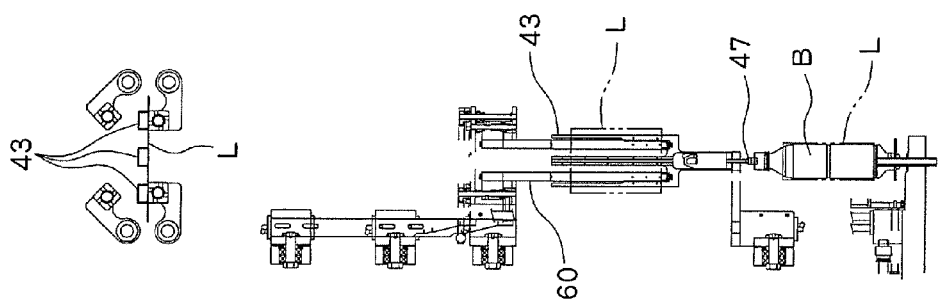
FIG. 16b View illustrating the state of the fitting head at position S5.
Figure 16A:
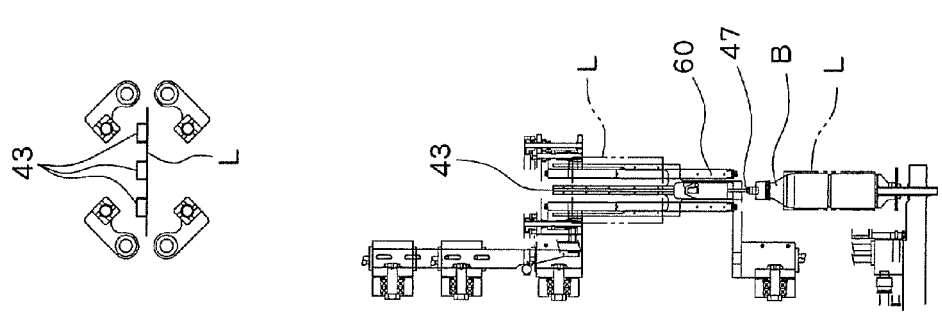
FIG. 16a View illustrating the state of the fitting head at position S4.

Thereafter, as illustrated in FIG. 16*b*, only the first suction rods 60*a* move in the close direction such that the first suction rods 60*a* come close to the sheet-shape label L which is held by the take-up member 43 by suction. In this state, the first suction rods 60*a* start the suction operation to suck one side of the sheet-shape label L.

When the label L is held by the first suction rods 60*a* by suction, the take-up member 43 releases the suction holding of the label L and then moves upward above the suction rods 60, as illustrated in FIG. 16*c*.

With this upward movement of the take-up member 43, the head holding member 47 holding the head portion of the target body B also moves upward. At this time, as the fitting head 6 and the mounting base 31 has reached the target body discharge position S6, the target body B on which the label has been fitted is discharged to the target body discharge device 5. Thereafter, when the fitting head 6 and the mounting base 31 reach the target body supply position 87, a new target body B on which a label has not yet been fitted is supplied and placed on the mounting base 31.

On the other hand, at this time, the second suction rods 60*b* move in the close direction and also start the suction operation to hold the other side of the label L by suction. Thereafter, the process returns to the state as illustrated in FIG. 15*a* and a similar procedure is repeated.

As is clear from the above description, according to the present embodiment, when the label L is transferred from the lower side feed belt 16*c* to the take-up member 43 and from the take-up member 43 to the opener mechanism 50, the movement of the label L in the width direction thereof does not occur. As a result, a shift of the label L in the width direction with respect to the opener mechanism 50 can be effectively prevented.

Further, by holding the label L by suction in a linear manner by using the four suction rods 60 having a plurality of suction holes 62 formed thereon in arrays, it is possible to open the label L in a stable manner. Further, by slightly shifting the positions of these suction holes 62 between the opposing suction rods 60, it is possible to separate the overlapping two films more properly to thereby open the label L in a more stable manner. It should be noted that the structure described above is only an example, and any modifications may be made as long as the take-up member incorporated into the fitting head, when passing the label supply position, sucks the label held by the label supply mechanism and, by moving forward along the transport path, separates and receives the label from the label supply unit.

REFERENCE SYMBOL LIST

1 label fitting system, 2 target body supply device, 3 label supply unit, 4 label fitting device, 5 target body discharge device, 6 fitting head, 7 transport unit, 11 base member feed roller pair, 12 cutting device, 13 upper side feed mechanism, 14 guide member, 16 lower side feed mechanism, 18 label detection sensor, 22 linear guide, 31 mounting base, 39*b* lower side cam columnar member, 39*u* upper side cam columnar member, 40 take-up mechanism, 43 take-up member, 44a suction hole, 47 head holding member, 50 opener mechanism, 58a, 58b support arm, 60a first suction rod (first suction member), 60b second suction rod (second suction member), 61 inner pipe, 62 suction hole, 64 outer pipe, B target body, L label, M label base material.

The invention claimed is:

1. A label fitting device that opens a cylindrical label which is folded into a sheet shape and fits the label onto a columnar target body, the label fitting device comprising:
    a plurality of mounting bases each moving along a predetermined transport path in a state in which the target body is placed thereon to thereby transport the target body;
    fitting heads respectively provided for the mounting bases on a one-to-one basis, each fitting head moving along the transport path in synchronization with the mounting bases and opening the label which is folded into a sheet shape and fitting the label onto the target body placed on the mounting base; and
    a label supply unit that cuts an elongated label base material sequentially to form the label and feeds the label base material and the label which is formed sequentially downward to transfer the label to the fitting head at a label supply position located immediately above the transport path,
    wherein
    each fitting head includes:
    a take-up member that is provided immediately above the mounting base and that sucks the label held by the label supply unit when passing the label supply position and moves forward along the transport path with the movement of the fitting head to thereby separate the label from the label supply unit and receives the label; and
    an opener mechanism that is provided immediately above the mounting base and that moves upward to a position above the target body placed on the mounting base to receive the label from the take-up member and thereafter fits the label onto the target body placed on the mounting base.

2. The fitting device according to claim 1, wherein
    the take-up member has a shape which is symmetrical with respect to a center in the width direction of the label base material or the label.

3. The fitting device according to claim 1, further comprising:
    a head holding member that is fixed to the take-up member and projects downward,
    wherein
    the take-up member, when the label is to be fitted onto the target body by the opener mechanism, moves downward such that the head holding member comes into contact with a head portion of the target body to press the target body to the mounting base.

4. The fitting device according to claim 1, wherein
    the opener mechanism includes a first suction member for holding one side of the label by suction, and
    the label is transferred from the take-up member to the opener mechanism by releasing suction of the label by the take-up member after the first suction member sucks the one side of the label which is held by the take-up member by suction.

5. The fitting device according to claim 4, wherein
    the opener mechanism further includes:
    a second suction member that is provided opposing the first suction member with the label interposed therebetween and holds other side of the label by suction; and
    a drive mechanism that causes the first suction member and the second suction member to move close to each other and sandwich the label which is folded and thereafter causes the first suction member and the second suction member to move away from each other and open the label which is folded.

6. The fitting device according to claim 5, wherein
    at the time of fitting the label, the first suction member and the second suction member, while holding the label by suction, move downward until the label reaches a predetermined fitting height.

* * * * *